US012784222B2

(12) United States Patent
Vashist et al.

(10) Patent No.: US 12,784,222 B2
(45) Date of Patent: Nov. 3, 2026

(54) IMAGE SEGMENTATION FOR SIZE ESTIMATION AND MACHINE LEARNING-BASED MODELING FOR PREDICTING RATES OF SIZE CHANGES OVER TIME

(71) Applicant: OTSUKA PHARMACEUTICAL DEVELOPMENT & COMMERCIALIZATION, INC., Rockville, MD (US)

(72) Inventors: Akshay Vashist, Princeton Junction, NJ (US); Hossain Saboonchi, Princeton, NJ (US); Jong-Hoon Ahn, Randolph, NJ (US)

(73) Assignee: OTSUKA PHARMACEUTICAL DEVELOPMENT & COMMERCIALIZATION, INC., Rockville, MD (US)

( * ) Notice: Subject to any disclaimer, the term of this patent is extended or adjusted under 35 U.S.C. 154(b) by 294 days.

(21) Appl. No.: 18/390,022

(22) Filed: Dec. 20, 2023

(65) Prior Publication Data

US 2024/0212154 A1 Jun. 27, 2024

Related U.S. Application Data

(60) Provisional application No. 63/434,390, filed on Dec. 21, 2022.

(51) Int. Cl.

*G06T 7/00* (2017.01)
*G06T 7/11* (2017.01)
*G06T 7/62* (2017.01)

(52) U.S. Cl.

CPC .............. *G06T 7/0016* (2013.01); *G06T 7/11* (2017.01); *G06T 7/62* (2017.01);
(Continued)

(58) Field of Classification Search

CPC ... G06T 7/11; G06T 7/62; G06T 2207/20081; G06T 2207/20084; G06T 2207/30084;
(Continued)

(56) References Cited

U.S. PATENT DOCUMENTS

2016/0220208 A1* 8/2016 Nishino ............... G01N 33/574
2018/0336319 A1* 11/2018 Itu .......................... G16B 25/10
(Continued)

OTHER PUBLICATIONS

Mader G, Mladsi D, Sanon M, Purser M, Barnett CL, Oberdhan D, Watnick T, Seliger S. A disease progression model estimating the benefit of tolvaptan on time to end-stage renal disease for patients with rapidly progressing autosomal dominant polycystic kidney disease. BMC Nephrol. Oct. 18, 2022 (Year: 2022).*

*Primary Examiner* — Atiba O Fitzpatrick
(74) *Attorney, Agent, or Firm* — Pillsbury Winthrop Shaw Pittman LLP

(57) ABSTRACT

A system may access a source image of the subject. A system may execute an image segmentation model that uses the source image to distinguish the target object from among other objects in the source image. A system may generate a binary image of the target object based on execution of the image segmentation model. A system may generate, based on the binary image, a size estimate of the target object. A system may execute a machine learning-based model that uses the size estimate and one or more covariates to predict a future size of the target object. A system may determine a risk classification for the subject based on the predicted growth rate, the risk classification being based on a probability that the target object of the subject will result in a disease state, the risk classification to be used to determine a treatment regimen to treat or prevent the disease state.

22 Claims, 25 Drawing Sheets

(52) U.S. Cl.
CPC ............... *G06T 2207/20081* (2013.01); *G06T 2207/20084* (2013.01); *G06T 2207/30084* (2013.01)

(58) Field of Classification Search
CPC ............................... G06T 7/0012–0016; G06T 2207/10064–10136; G06T 2207/30004–30104; G06T 7/10–194; G06T 2207/20021; G06T 2207/20112–20168; G06T 9/002; G06T 5/60; G06V 2201/03–034; G06V 2201/031; G06V 10/25–273; G06V 20/49; G06V 20/695; G06V 40/162; G06V 20/80; G06V 20/698; G06V 10/70; G06V 10/82; G06V 10/774–7796; G06V 10/454; A61B 5/201; A61B 5/1073; A61B 5/107; A61B 5/1072; A61B 5/7485; G06K 9/6224; G06K 9/6256; G06K 9/6257; G06K 9/6259; G06F 18/24155; G06F 18/2415; G06F 18/214–2155; G06F 7/023; G06F 40/16; G06N 3/02–126; G06N 20/00–20; G01N 29/4481
See application file for complete search history.

(56) References Cited

U.S. PATENT DOCUMENTS

| | | | | |
|---|---|---|---|---|
| 2019/0237186 | A1* | 8/2019 | El-Baz | G16H 30/40 |
| 2020/0005900 | A1* | 1/2020 | Cha | G16H 10/40 |
| 2021/0166813 | A1* | 6/2021 | Maher | G16B 5/00 |
| 2021/0327540 | A1* | 10/2021 | Schobel | G16H 70/20 |
| 2021/0343419 | A1* | 11/2021 | Hafez | G16H 50/20 |
| 2022/0036575 | A1* | 2/2022 | Shin | A61B 5/4244 |
| 2022/0051771 | A1* | 2/2022 | Lyman | G06F 16/245 |
| 2022/0230310 | A1* | 7/2022 | Xie | G06T 7/12 |
| 2023/0027734 | A1* | 1/2023 | Washko, Jr. | A61B 6/50 |
| 2023/0080350 | A1* | 3/2023 | Nadkarni | G06N 3/0985 705/2 |
| 2023/0145034 | A1* | 5/2023 | Baldauf-Lenschen | G16H 40/67 382/128 |
| 2024/0202917 | A1* | 6/2024 | Washko, Jr. | G16H 50/50 |
| 2024/0382106 | A1* | 11/2024 | Irazabal Mira | A61B 5/4842 |
| 2025/0132039 | A1* | 4/2025 | Wellmann | G16H 50/30 |
| 2025/0302394 | A1* | 10/2025 | Yankeelov | G16H 30/40 |

* cited by examiner

600

1500A

1500B

IMAGE SEGMENTATION FOR SIZE ESTIMATION AND MACHINE LEARNING-BASED MODELING FOR PREDICTING RATES OF SIZE CHANGES OVER TIME

RELATED APPLICATIONS

This application claims the benefit of U.S. Provisional Patent Application No. 63/434,390, filed: Dec. 21, 2022, entitled "IMAGE SEGMENTATION FOR SIZE ESTIMATION AND MACHINE LEARNING-BASED MODELING FOR PREDICTING RATES OF SIZE CHANGES OVER TIME," of which is incorporated herein by reference in its entirety.

BACKGROUND

Computer vision is an Artificial Intelligence (AI) based field that may involve training a computer to derive meaningful information from images, which may be static images or video images. Computer vision may be applied to a wide range of areas, such as medical imaging, autonomous driving, facial recognition, manufacturing, and others. However, computer vision techniques may be cumbersome to train, require vast amounts of training data, and has not been extended to make predictions based on image recognition in particular contexts.

SUMMARY

The disclosure relates to AI-based image segmentation models for size estimation of target objects from among noisy images and machine learning-based modeling to predict growth rates based on the size estimate and covariate data that correlate with the growth rates.

In some examples, the techniques described herein relate to a system for diagnostic image analysis of a target object that is inside a subject, the system including: a processor programmed to: access a source image of the subject; execute an image segmentation model that uses the source image to distinguish the target object from among other objects in the source image; generate a binary image of the target object based on execution of the image segmentation model; generate, based on the binary image, a size estimate of the target object; execute a machine learning-based model that uses the size estimate and one or more covariates to predict a future size of the target object; and determine a risk classification for the subject based on the predicted growth rate, the risk classification being based on a probability that the target object of the subject will result in a disease state, the risk classification to be used to determine a treatment regimen to treat or prevent the disease state.

In some examples, the techniques described herein relate to a system, wherein the source image includes a baseline image of the subject taken at a first time.

In some examples, the techniques described herein relate to a system, wherein the machine learning-based model predicts the future size based on the baseline image.

In some examples, the techniques described herein relate to a system, wherein the processor is further programmed to: access a second source image of the subject taken at a second time after the first time, wherein the machine learning-based model predicts the future size based on the baseline image and the second source image, the machine learning-based model having been trained to predict the growth rate based on source images taken at different times.

In some examples, the techniques described herein relate to a system, wherein to predict the growth rate, the processor is further programmed to: execute the machine learning-based model to generate a posterior probability distribution of a rate of change in size of the target object over time.

In some examples, the techniques described herein relate to a system, wherein the processor is further programmed to: translate the posterior probability distribution to classify the data into a binary class representing the likelihood of a growth rate in the size of the target object that exceeds a threshold growth rate.

In some examples, the techniques described herein relate to a system, wherein processor is further programmed to: automatically configure one or more hyperparameters for training the image segmentation model.

In some examples, the techniques described herein relate to a system, wherein the size estimate includes a volume estimate.

In some examples, the techniques described herein relate to a system, wherein the target object includes an organ or tissue of the subject.

In some examples, the techniques described herein relate to a system, wherein the target object includes a kidney of the subject.

BRIEF DESCRIPTION OF THE DRAWINGS

Features of the present disclosure may be illustrated by way of example and not limited in the following Figure(s), in which like numerals indicate like elements, in which.

DETAILED DESCRIPTION

The disclosure relates to AI-based image segmentation models for recognizing and estimating a size of a target object in a source image. The disclosure further relates to machine learning-based modeling for generating a posterior probability distribution of a rate of change in size (or growth rate) of the target object over time based on the size estimate and one or more covariates. The machine learning-based modeling may translate the posterior probability distribution of a rate of change to a binary class representing the likelihood of a growth rate in the size of the target object that exceeds a threshold growth rate.

The systems and methods may be implemented in various contexts. For example, the target object may include internal structures such as organs, tissues, or other parts of a subject for which a size is estimated and rate of change in size is predicted based on the size estimate and one or more covariates having values that are associated with the subject. In these examples, the subject may be imaged using imaging devices such as Magnetic Resonance Imaging (MRI) devices, Computerized Tomography (CT) devices, X-ray devices, and/or other types of medical imaging devices that generate source images of the body. A source image of the subject may include the target object along with other objects that are also imaged. For example, the source image may include an image of a kidney, a liver, a spleen, and/or other organs and tissues. In particular, if the target object is a kidney, then the system will isolate the kidney using an image segmentation model that is trained to identify the kidney from noise in the image. In this context, "noise" refers to objects that are outside the boundaries of a target object. In some examples, the image segmentation model may generate a binary image from the source image, in which case the target object is indicated in one color (such as black) while all other objects like noise are indicated in another color (such as white or no color). Other types of binary indications may be made as well, so long as the target object is distinguished from noise in the source image. Although binary images are described throughout for illustration, it should be noted that other numbers of objects in a source image may be recognized by the image segmentation model, which may result in, for example ternary images. In particular, a binary image may result when the image segmentation model identifies the boundaries of a kidney in a source image while a ternary image may result when the image segmentation model identifies the boundaries of a kidney and a liver (and/or other organs or tissue) in the source image.

Figure 1:
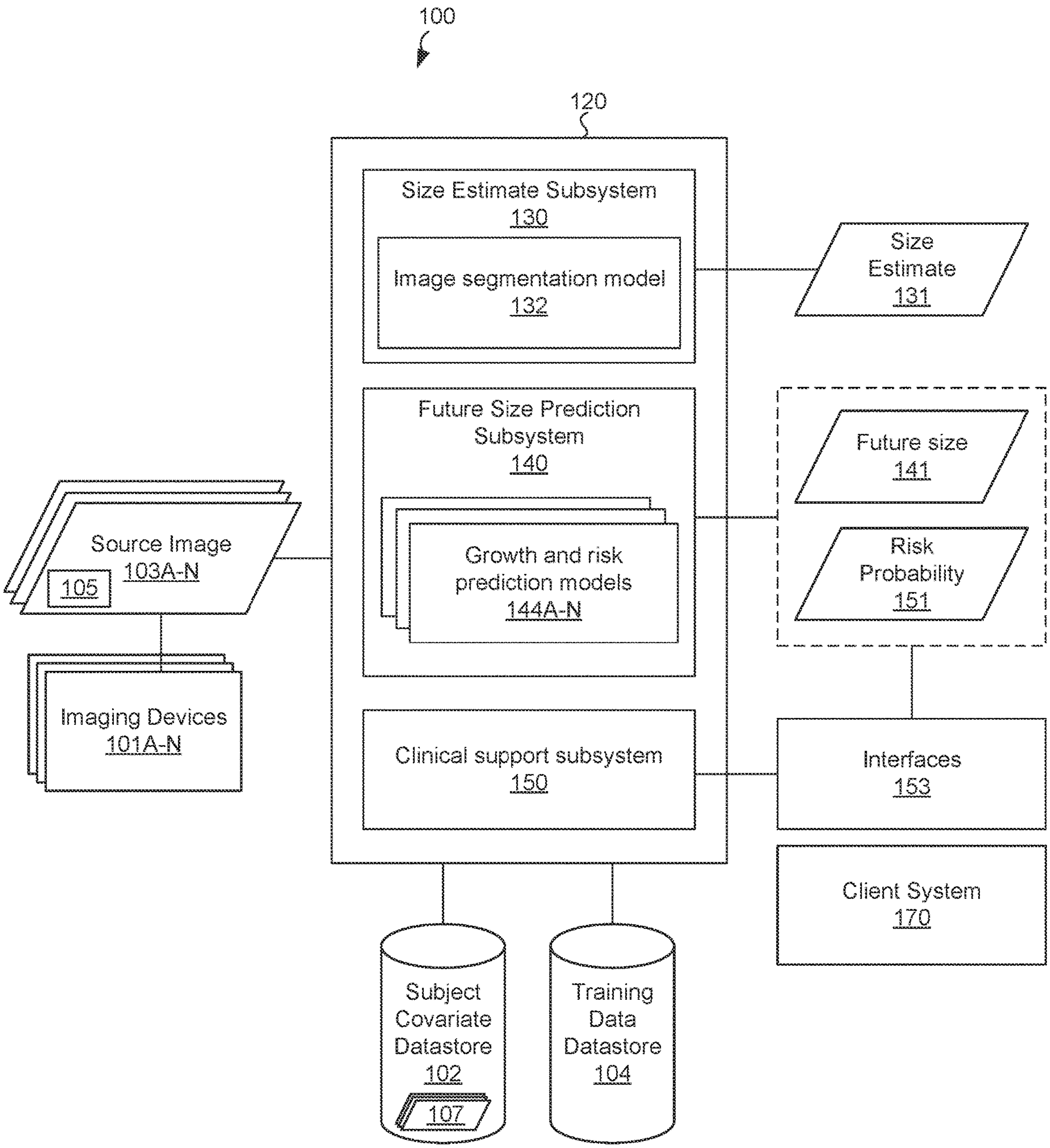
FIG. 1 illustrates an example of a system of AI-based image segmentation for determine size estimate of a target object and machine learning-based models for predicting a future size of the target object.

Having described a high level overview of various features of the disclosure, attention will now turn to an example of a system for estimating the size of a target object and predicting a future size of the target based on the size estimate. For example, FIG. 1 illustrates an example of a system 100 of AI-based image segmentation for determine size estimate of a target object 105 and machine learning-based models for predicting a future size of the target object.

One issue in computer vision is the need to isolate a target object being analyzed from the remaining portions in an image since the target object is usually imaged with other objects. When analyzing a target object, these other objects represent noise such as non-targeted objects that should be removed or ignored. Another issue with computer vision is that training models to recognize target objects can overfit or underfit the data because of model complexity in which the available data is less than the number of parameters or the number of parameters is greater than the available data. Another issue may arise when predicting the future size of a target object. For instance, when the size of a target object is estimated, there may be no effective way to predict a future size such as a size at a later date and/or rate of change in size. In particular, there may be no available baseline value such as a size estimate to make such prediction. These and other issues arise in various computer vision contexts. The system 100 may solve these and other issues in various computer vision contexts. For illustration, a particular example of kidney size estimate will be described herein throughout. However, the systems and methods described herein may be used in other computer vision contexts in which a target object is isolated and whose size is estimated and/or growth rate is predicted.

Kidney size may be important for disease diagnosis and control. For example, Autosomal Dominant Polycystic Kidney Disease (ADPKD) is the most common monogenic kidney disease, and the leading inheritable cause of end-stage renal disease among adults. Total Kidney Volume (TKV) is the most cited prognostic indicators associated with rapid ADPKD progression, and early identification of likely rapid progression by estimating a baseline TKV and predicting a future TKV is important. To estimate TKV, healthcare professionals may use subjective decisions prone to error. Furthermore, predicting future data such as future TKV or rate of growth of the kidney is generally not a problem that healthcare professionals can solve. Thus, it may be problematic to automatically, accurately, and precisely (1) estimate a baseline TKV, and (2) predict a future TKV and associated risk.

To address these and other issues relevant to computer vision, the system 100 may include a plurality of imaging devices 101 (illustrated as imaging devices 101A-N), a subject covariate datastore 102, a training data datastore 104, a computer system 120, a client device 170, and/or other features. The various components of the system 100 may be connected to one another via one or more networks. One or more of the networks may be a communications network including one or more Internet Service Providers (ISPs). Each ISP may be operable to provide Internet services, telephonic services, and the like, to one or more devices, such as the computer system 120 and the client device 170. In some examples, one or more of the networks may facilitate communications via one or more communication protocols, such as those mentioned above (for example, TCP/IP, HTTP, WebRTC, SIP, WAP, Wi-Fi (for example, 802.11 protocol), Bluetooth, radio frequency systems (for example, 900 MHz, 1.4 GHz, and 5.6 GHz communication systems), cellular networks (for example, GSM, AMPS, GPRS, CDMA, EV-DO, EDGE, 3GSM, DECT, IS 136/TDMA, iDen, LTE or any other suitable cellular network protocol), infrared, BitTorrent, FTP, RTP, RTSP, SSH, and/or VOIP.

An imaging device 101 may generate source images 103 that may include an image of a target object 105. For example, the imaging device 101 may include a medical imaging device that generates source images 103 of a subject. The medical imaging device may include an MRI device, a CT scan device, an X-ray device, and/or other types of imaging device that can generate images of the subject. In this example, the source image 103 may include an MRI scan image, a CT scan image, an X-ray image, and/or other types of medical device images. Other types of imaging devices 101 may be used depending on the context in which the system 100 is implemented. For example, for other types of computer vision contexts, the imaging device 101 may include a radar device, a LiDAR device, a photo camera device, an IR camera device, and/or other type of device that can generate an image to which computer vision may be applied to estimate a size of a target object sensed by the imaging device 101.

The subject covariate datastore 102 may store covariates 107 such as subject demographics, subject test results, and/or other covariate data. The training data datastore 104 may include clinical trial data that includes a plurality of source images of target objects such as organs, tissues, or other objects of interest.

The computer system 120 may include a server device, a laptop or desktop computer, a tablet computer, a smartphone, and/or other type of computing device. The computer system 120 may be implemented as a cloud-based system and/or an on-premises system. The computer system 120 may include a size estimate subsystem 130, a future size prediction subsystem 140, a clinical support subsystem 150, and/or other features. Some or all of the subsystems and/or features may be implemented in hardware or software that programs hardware.

Continuing the previous example context for illustration, the computer system 120 may automatically generate a size estimate 131 (such as a TKV estimate) based on one or more source images 103. The computer system 120 may use the size estimate 131 as a baseline and predict a future size 141 to facilitate identification of subjects who are likely to have certain risk probability 143 (such as a greater than 5% kidney growth annually over three years). The computer system 120 may generate the risk probability 143 based on the size estimate 131 and data known about the subject such as gender, age, height, weight, blood serum creatinine value, and/or other data known about the subject. In some examples, the computer system 120 may be used for a particular set of subjects. For example, the computer system 120 may be used to generate a risk probability 143 for at-risk subjects, such as those who are 18 years or older and have been diagnosed with ADPKD according to standard criteria. The risk probability 143 may then be used by healthcare professionals in the context of other available risk assessment tool results and clinical information to optimize clinical management. The computer system 120 may be used with T1-weighted magnetic resonance images, non-enhanced, acquired according to the specific image acquisition protocol and image acceptance criteria used by the computer system. The annualized TKV percent change >5% prediction is not indicated for use in patients being treated with disease modifying ADPKD treatment (excluding antihypertensive medications).

Generating an Estimated Size of a Target Object Based on Image Segmentation

The size estimate subsystem 130 may generate a size estimate of a target object 105 that is imaged in one or more source images 103. For example, the size estimate subsystem 130 may access one or more source images 103 and provide the source images 103 as input to an image segmentation model 132. The image segmentation model 132 may be an AI-based image segmentation model that is trained to group a source image into segments. One of the segments may represent the target object 105 and other segments may represent noise to be ignored for analysis purposes. The image segmentation model 132 may be trained using various techniques. Reference will be made to image segmentation model 132A when U-net modeling is used and image segmentation model 132B when a nnU-net modeling is used. Other types of modeling may be used as well or instead. The term "image segmentation model 132" will be referred to when referring an image segmentation model more generally.

Image segmentation is a method of dividing a digital image into subgroups called image segments, reducing the complexity of the image and enabling further processing or analysis of each image segment. Technically, segmentation is the assignment of labels to pixels, voxels, or other image unit to identify objects or other elements in the image. A common use of image segmentation is in object detection. Instead of processing the entire image, a common practice is to first use an image segmentation algorithm to find objects of interest in the image. Then, the object detector can operate on a bounding box already defined by the segmentation algorithm. This prevents the detector from processing the entire image, improving accuracy and reducing inference time. Image segmentation is a key building block of computer vision technologies and algorithms. It is used for many practical applications including medical image analysis, computer vision for autonomous vehicles, face recognition and detection, video surveillance, and satellite image analysis.

Image segmentation is a function that takes image inputs and produces an output. The output is a mask or a matrix with various elements specifying the object class or instance to which each pixel belongs. Several relevant heuristics, or high-level image features, can be useful for image segmentation. These features are the basis for standard image segmentation algorithms that use clustering techniques like edges and histograms. An example of a popular heuristic is color. Graphics creators may use a green screen to ensure the image background has a uniform color, enabling programmatic background detection and replacement in post-processing.

Another example of a useful heuristic is contrast—image segmentation programs can easily distinguish between a dark figure and a light background (i.e., the sky). The program identifies pixel boundaries based on highly contrasting values. Traditional image segmentation techniques based on such heuristics can be fast and simple, but they often require significant fine-tuning to support specific use cases with manually designed heuristics. They are not always sufficiently accurate to use for complex images.

Newer segmentation techniques use machine learning and deep learning to increase accuracy and flexibility.

Machine learning-based image segmentation approaches use model training to improve the program's ability to identify important features. Deep neural network technology is especially effective for image segmentation tasks. There are various neural network designs and implementations suitable for image segmentation. They usually contain the same basic components: An encoder—a series of layers that extract image features using progressively deeper, narrower filters. The encoder might be pre-trained on a similar task (e.g., image recognition), allowing it to leverage its existing knowledge to perform segmentation tasks. A decoder—a series of layers that gradually convert the encoder's output into a segmentation mask corresponding with the input image's pixel resolution. Skip connections—multiple long-range neural network connections allowing the model to identify features at different scales to enhance model accuracy.

Semantic segmentation involves arranging the pixels in an image based on semantic classes. In this model, every pixel belongs to a specific class, and the segmentation model does not refer to any other context or information. For example, semantic segmentation performed on an image with multiple trees and vehicles, will provide a mask that categorizes all types of trees into one class (tree) and all types of vehicles, whether they are buses, cars, or bicycles, into one class (vehicles).

This approach results in the problem statement being often poorly defined, especially if there are several instances grouped in the same class. For example, an image of a crowded street might segment the entire area of the crowd as the "people" class. The semantic segmentation does not provide in-depth detail into complex images like this. Instance segmentation involves classifying pixels based on the instances of an object (as opposed to object classes). Instance segmentation algorithms do not know which class each region belongs to—rather, they separate similar or overlapping regions based on the boundaries of objects. For example, suppose an instance segmentation model processes an image of a crowded street. It should ideally locate individual objects within the crowd, identifying the number of instances in the image. However, it cannot predict the region or object (i.e., a "person") for each instance. Panoptic segmentation is a newer type of segmentation, often expressed as a combination of semantic and instance segmentation. It predicts the identity of each object, segregating every instance of each object in the image.

Panoptic segmentation is useful for many products that require vast amounts of information to perform their tasks. For example, self-driving cars must be able to capture and understand their surroundings quickly and accurately. They can achieve this by feeding a live stream of images to a panoptic segmentation algorithm.

Edge-based segmentation is a popular image processing technique that identifies the edges of various objects in a given image. It helps locate features of associated objects in the image using the information from the edges. Edge detection helps strip images of redundant information, reducing their size and facilitating analysis. Edge-based segmentation algorithms identify edges based on contrast, texture, color, and saturation variations. They can accurately represent the borders of objects in an image using edge chains comprising the individual edges.

Thresholding is the simplest image segmentation method, dividing pixels based on their intensity relative to a given value or threshold. It is suitable for segmenting objects with higher intensity than other objects or backgrounds. The threshold value T can work as a constant in low-noise images. In some cases, it is possible to use dynamic thresholds. Thresholding divides a grayscale image into two segments based on their relationship to T, producing a binary image.

Region-based segmentation involves dividing an image into regions with similar characteristics. Each region is a group of pixels, which the algorithm locates via a seed point. Once the algorithm finds the seed points, it can grow regions by adding more pixels or shrinking and merging them with other points.

Clustering algorithms are unsupervised classification algorithms that help identify hidden information in images. They augment human vision by isolating clusters, shadings, and structures. The algorithm divides images into clusters of pixels with similar characteristics, separating data elements and grouping similar elements into clusters.

Watersheds are transformations in a grayscale image. Watershed segmentation algorithms treat images like topographic maps, with pixel brightness determining elevation (height). This technique detects lines forming ridges and basins, marking the areas between the watershed lines. It divides images into multiple regions based on pixel height, grouping pixels with the same gray value. The watershed technique has several important use cases, including medical image processing. For example, it can help identify differences between lighter and darker regions in an MRI scan, potentially assisting with diagnosis.

One example of the image segmentation model 132 is a nnU-Net model, which is based on the U-Net model. An example of an nnU-Net model is described in *F. Isensee et al.*, nnU-Net: a self-configuring method for deep learning-based biomedical image segmentation, Nature Methods 18, 203-211 (2021), which is incorporated by reference in its entirety herein for all purposes. The U-Net model is a convolutional neural network ("CNN") that is trained to perform image segmentation on biomedical imaging. Examples of training, validating, and using an image segmentation model 132 based on the U-Net model is illustrated in FIGS. 3A, 4A, 5A, and 5B. One issue with the U-Net model and other CNNs is the potential need to configure model parameters or hyperparameters, identify features, and/or other input other operational details that are prone to error, lead to inefficient training, and may rely on manual processes. nnU-Net may automate the operational phase of U-Net. Examples of training, validating, and using an image segmentation model 132 based on the nnU-Net model is illustrated in FIGS. 3B, 4B, and 6. Many biological/medical image segmentation tasks are performed by U-Net, which is a popular and state-of-the-art deep learning model. When building a deep network or a U-Net, there are lots of hyperparameters (e.g., learning rate, number of layers, number of kernels, etc.) to be determined and they are usually determined by trial-and-error approach with experts' experience.

Furthermore, a deep learning model requires vast numbers of training images. nnU-Net pipeline performs data augmentation by default (for avoiding such parameters over-fitting) during the model training. Data augmentation methods include rotating, scaling, adding Gaussian noise, Gaussian blurring, changing brightness and contrast, reducing image resolution, and mirroring. When more training images are necessary for probably better performance, additional data augmentation method such as random elastic deformation may be used.

In some examples, the image segmentation model 132 may generate one or more binary images. A binary image is one in which a segment of interest (namely the target object 105) from a source image 103 is distinguished from other parts of the source image. For example, pixels for two-dimensional images or voxels for three-dimensional images corresponding to the target object 105 may be colored black while pixels or voxels corresponding to non-targeted objects may be colored white. Other coloring and/or other distinguishing labeling may be used as well or instead, so long as a segment corresponding to the target object 105 is distinguishable from the non-targeted objects. The binary images generated by the image segmentation model 132 may represent borders of the target object 105.

The size estimate subsystem 130 may use the binary images output by the image segmentation model 132 to generate a size estimate of the target object 105. The size estimate may be a one-dimensional size estimate such as a length or width, a two-dimensional estimate such as an area, or a three-dimensional size estimate such as a volume. For biomedical examples, the size estimate may be a determined size such as total volume of an organ, tissue, or other biological target that may be inside or outside of the subject's body. In a particular example illustrated in FIG. 2, the size estimate is an estimated volume of a kidney of the subject. In this illustrated example, the training data used for training the image segmentation model 132 may include source images from the training data datastore 102 for which voxels corresponding to kidneys in the source images are labeled. Other types of organs, tissues, or other biological targets may be segmented to determine their size estimates as well or instead.

Figure 2:
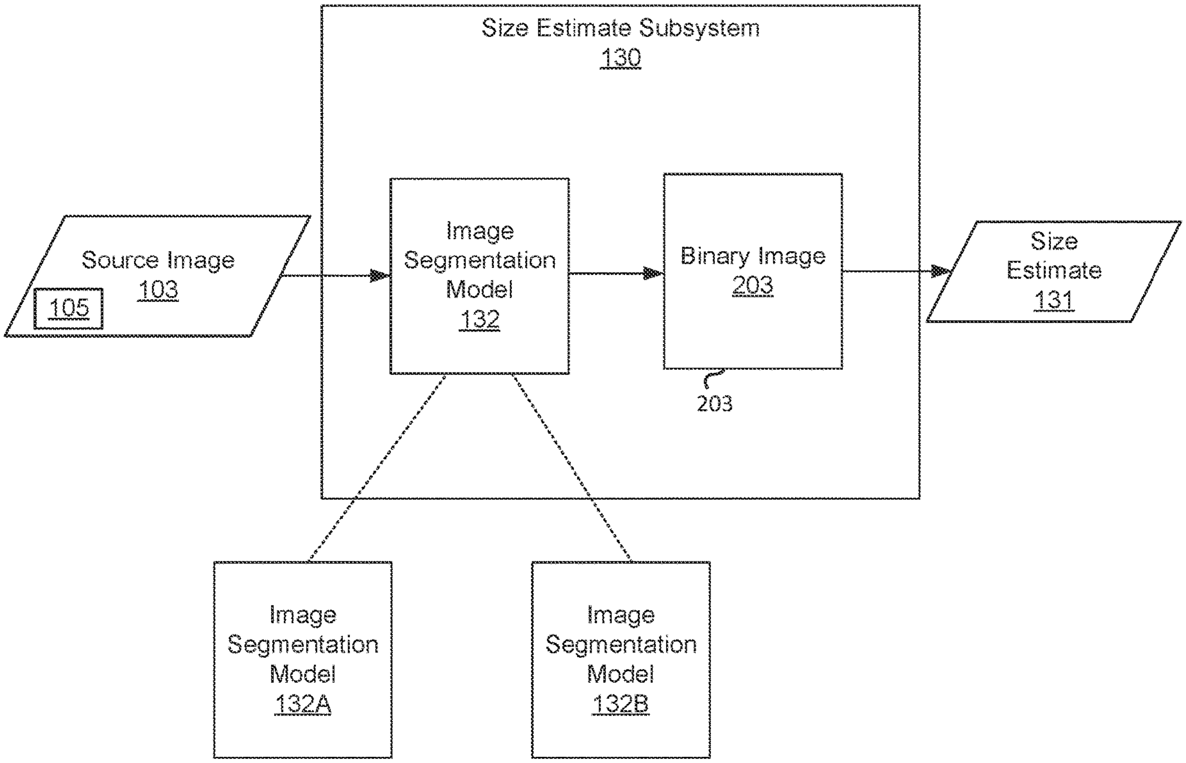
FIG. 2 illustrates an example of a flow diagram for estimating a size of a target object using AI-based image segmentation.

Referring to FIG. 2, the size estimate subsystem 130 may take as input a source image 103. For example, the source image 103 may be a DICOM MR image. DICOM is the international standard developed by American College of Radiology (ACR) and National Electrical Manufacturers Association (NEMA) to store and transmit medical images. DICOM MR image files have a plurality of attributes such as slice spacing, pixel resolution, and others. Certain ranges of these and other attributes may be out-of-range for a trained deep learning model to accurately model. Thus, in these instances, the size estimate subsystem 130 may perform pre-processing to transform out-of-range attributes for processing.

The size estimate subsystem 130 may provide the source image 103 (which may have been pre-processed) as input to and execute the image segmentation model 132. The image segmentation model 132 may generate one or more binary images 203. The illustrated binary image 203 is a binary image of a kidney, which was binarized to distinguish the kidney from noise, or other parts of the body that was imaged in the source image 103. Further in this example, the binary image 203 is a three-dimensional image with voxel positions that define the three-dimensional borders of the kidney. Binary values may be rounded up to 1 if greater than or equal to 0.5.

The size estimate subsystem 130 may generate the size estimate 131 based on the binary image 203. For example, the size estimate (volume) may be determined based on Equation 1:

$$S = C \times \Sigma_{ijk}\, b_{ijk}, \tag{1}$$

In which:

S is the size estimate 131 (in this case, volume),

C is a voxel-to-volume conversion ratio representing a unit physical volume per voxel, and $b_{ijk}$ is the (i,j,k)th voxel value of a binary image with $b_{ijk}=1$ for kidneys and $b_{ijk}=0$ otherwise (for noise).

The size estimate subsystem 130 may determine other size estimates such as a one-dimensional size estimate (length or width) based on a number of pixels (or voxels if determining a one-dimensional size from a three-dimensional image) or a two-dimensional size estimate (area) based on a length and width area calculation or, if irregular shaped, based on a sum of regular shape regular shape areas or other irregular area calculation techniques.

In operation, and continuing the kidney size estimate example, the image segmentation model 132 may be used for clinical practice by healthcare providers responsible for the medical management of subjects with kidney disorders such as Autosomal Dominant Polycystic Kidney disease (ADPKD). In this example operation, the image segmentation model 132 may take as input a series of T1-weighted MRI images in DICOM format, in coronal view, without fat saturation. The image segmentation model 132 may output a total kidney volume ("TKV") by highlighting the sections of the kidneys in the DICOM volume, which identifies voxels corresponding to kidneys in the MRI input series. The voxels may be used to generate binary images, which are used to determine the TKV.

In the discussion that follows, reference will be made first to FIGS. 3A, 4A, 5A, and 5B to describe image segmentation model 132A based on U-Net modeling. This discussion will be followed with reference to FIGS. 3B, 4B, and 6 to describe image segmentation model 132A based on nnU-Net modeling.

Figure 3A:
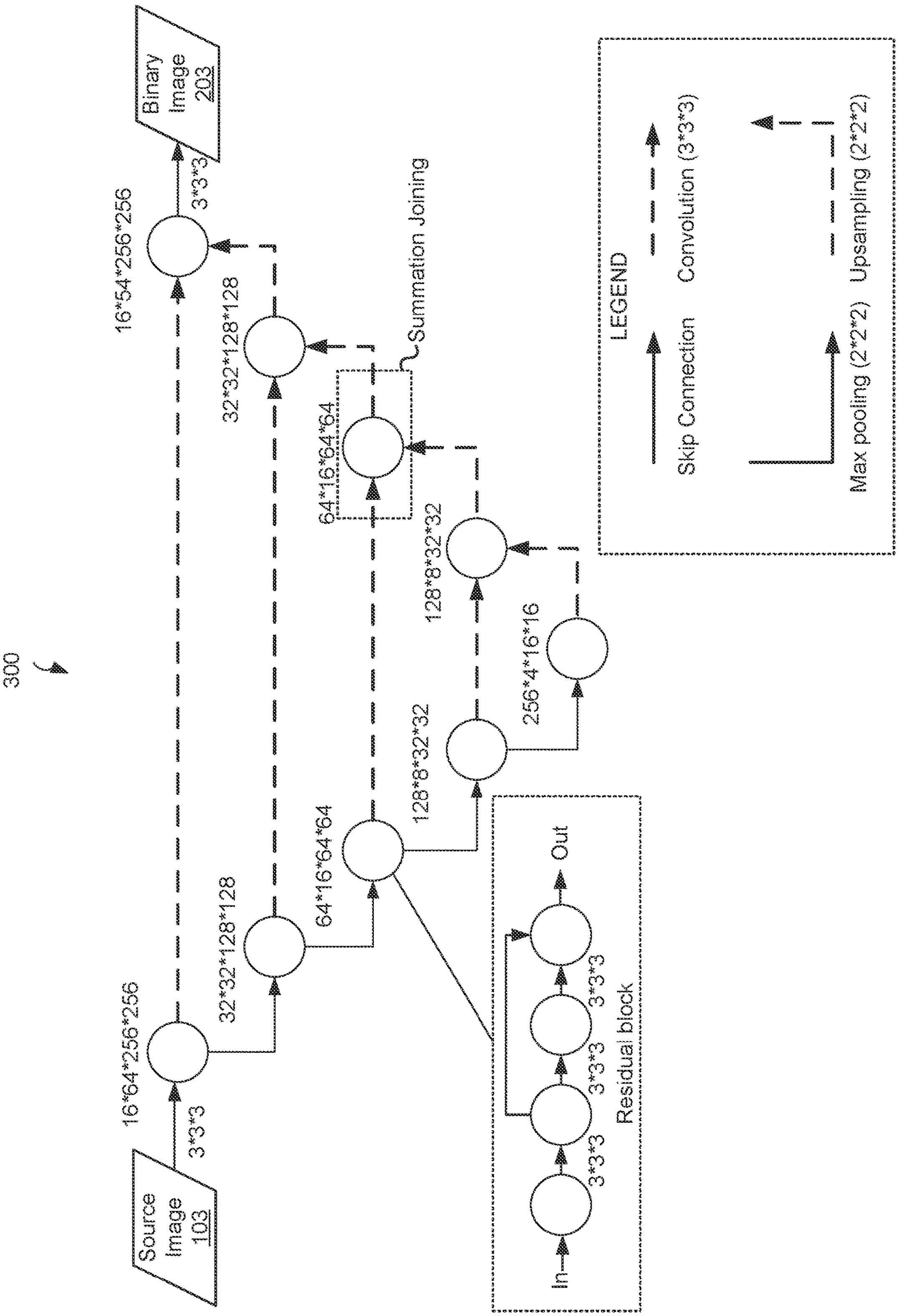
FIG. 3 illustrates an example of an architecture of an image segmentation model.
Figure 3B:
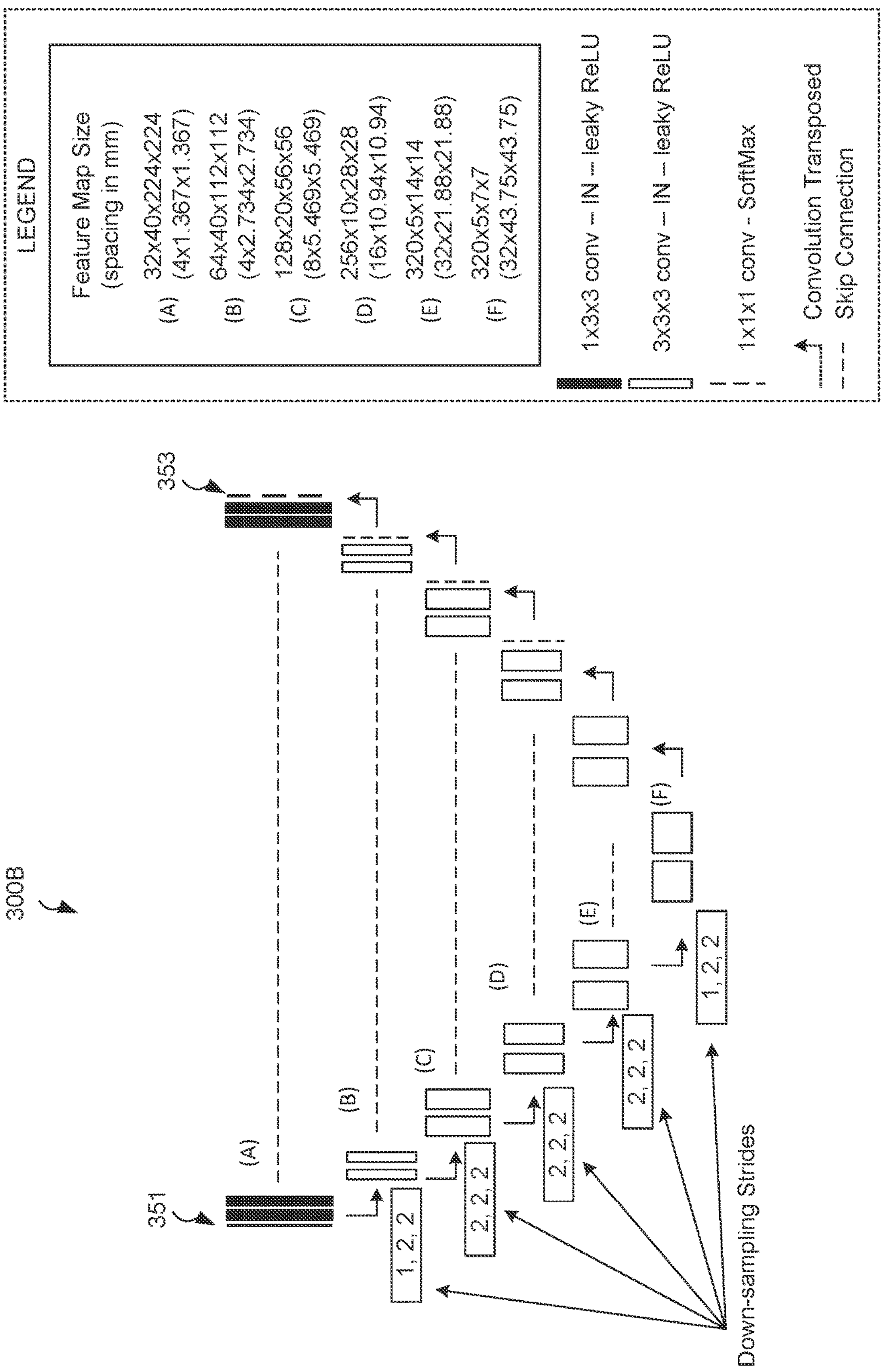

FIG. 3A illustrates an example of an architecture 300A of an image segmentation model 132. The architecture of the neural network used in calculating the TKV from a MRI T1 series is the Residual 3D U-Net, shown in FIG. 3, adapted from. This is a variant of the U-Net, a current state-of-the-art architecture for Convolution Neural Network-based medical image segmentation. Interpretability of the architecture is well known and discussed in the original reference. A detailed description of the version implemented in the system (general properties and specifications) is however discussed.

General properties of U-Net: Residual U-Net inherits the three main elements from U-Net, which give it the U shape to which it owes its name: the contracting/downsampling path on the left side, the expanding/upsampling path on the right side and the same-scale skip connections from the contracting path to the expanding path used to propagate context information. The contracting path learns to consider the context of the image, while the expansive path allows accurate localization.

Specific of architecture for the TKV model: in the Residual U-Net implemented for the TKV model, a residual skip connection is added to each module to allow the definition of a deeper neural network without vanishing gradients, since the information is propagated from the initial to the last layer: thanks to these residual modules, every path from the network's input to its output is a residual subnetwork. The basic block of this Residual U-Net for downsampling consists of a SingleConv followed by the residual block. The SingleConv is the basic convolutional module consisting of a 3D convolution block, a rectified linear unit (ReLU) activation, Group normalization and 3D max pooling operations.

The SingleConv takes care of increasing/decreasing the number of channels and also ensures that the number of output channels is compatible with the residual block that follows.

On the contrary, in the expansive path the architecture consists of the repeated application of 3D deconvolution through 3d transposed convolution block and of up-pooling operation: the output size reverses the max pooling operation from the corresponding layer in the contracting path and the number of channels is set so that the summation joining works correctly.

Another difference from the traditional U-Net is the use of summation joining instead of concatenation joining in the skip connections: this choice speeds up the training process during backpropagation and it also mitigates the vanishing gradient problem. The Residual U-Net which has also been modified to use the same convolution parameters to enable summation joining. In the last layer a convolution reduces the number of output channels to the number of labels which is 1 in our case: a softmax function is applied to the linearized two-channel output of the expansive path to represent the probability of each voxel to belong to the kidneys.

For training, an adapted Dice-coefficient loss function was used, and it was minimized using Adam optimizer. The Dice loss was computed as the mean of all 2D Dices on the various slices composing the series, in order to penalize the errors on peripheral slices, where the net has more difficulties. PYTORCH, a state-of-the-art deep learning library, was used for the Python programming language. The masks of the kidneys obtained as the Residual U-Net output are used to compute the TKV of the subject: the number of mask pixels is multiplied for the volume of each voxel, this one calculated in turn as the multiplication of the pixel spacing (DICOM tags (0028, 0030): Pixel spacing, (0020,0032): Image Position Subject) in the three directions (x, y, z). The input volumes are resampled to a target in-plane size of 256×256 pixels, and a target spacing between slices of 4 mm. During training, image augmentation is performed by applying in-plane rotation and non-linear distortion to the input volume.

Figure 4A:
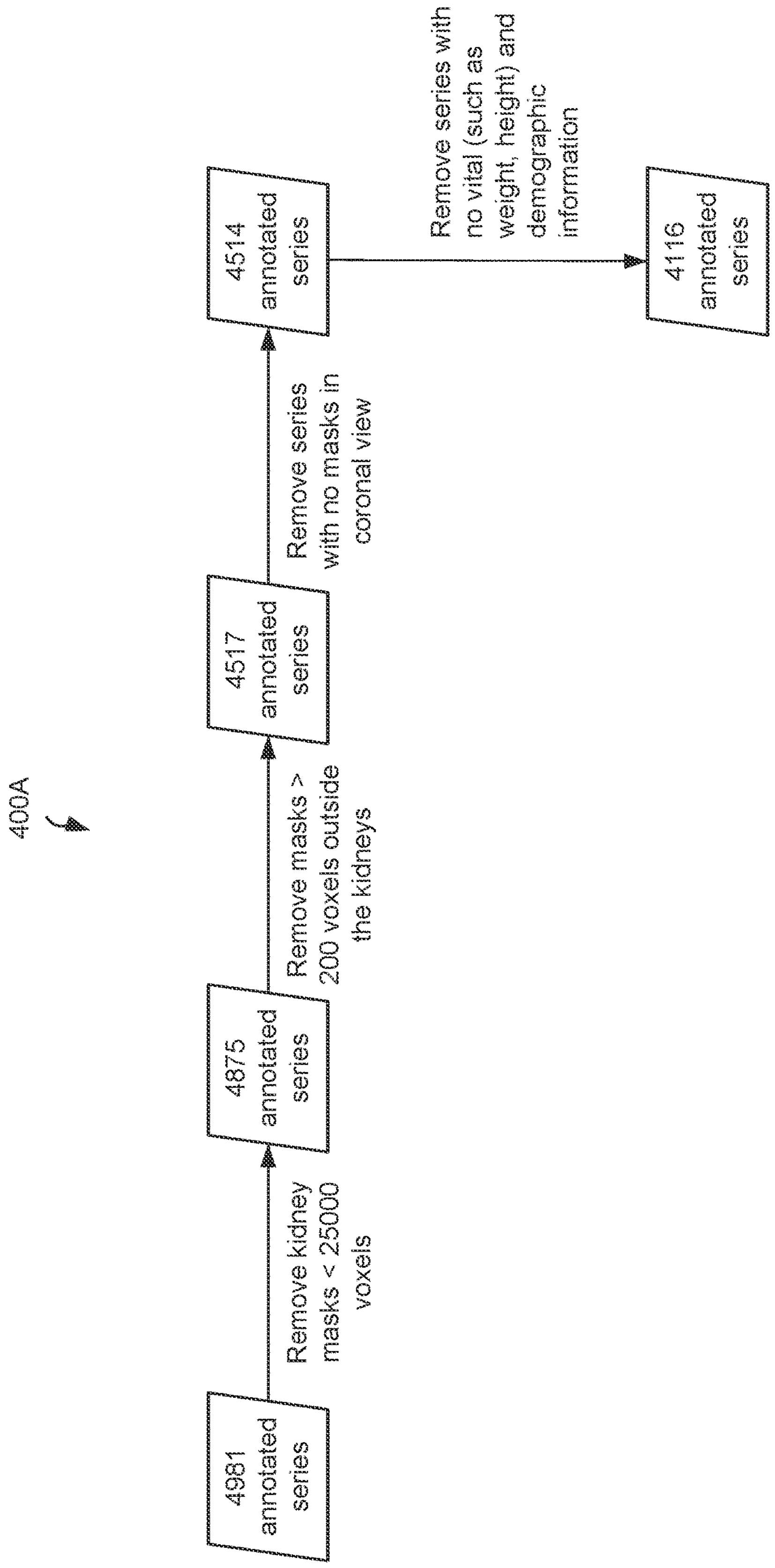
FIG. 4A illustrates an example of quality control filters of an imaging dataset used for the image segmentation model based on the architecture shown in FIG. 3A.
Figure 4B:
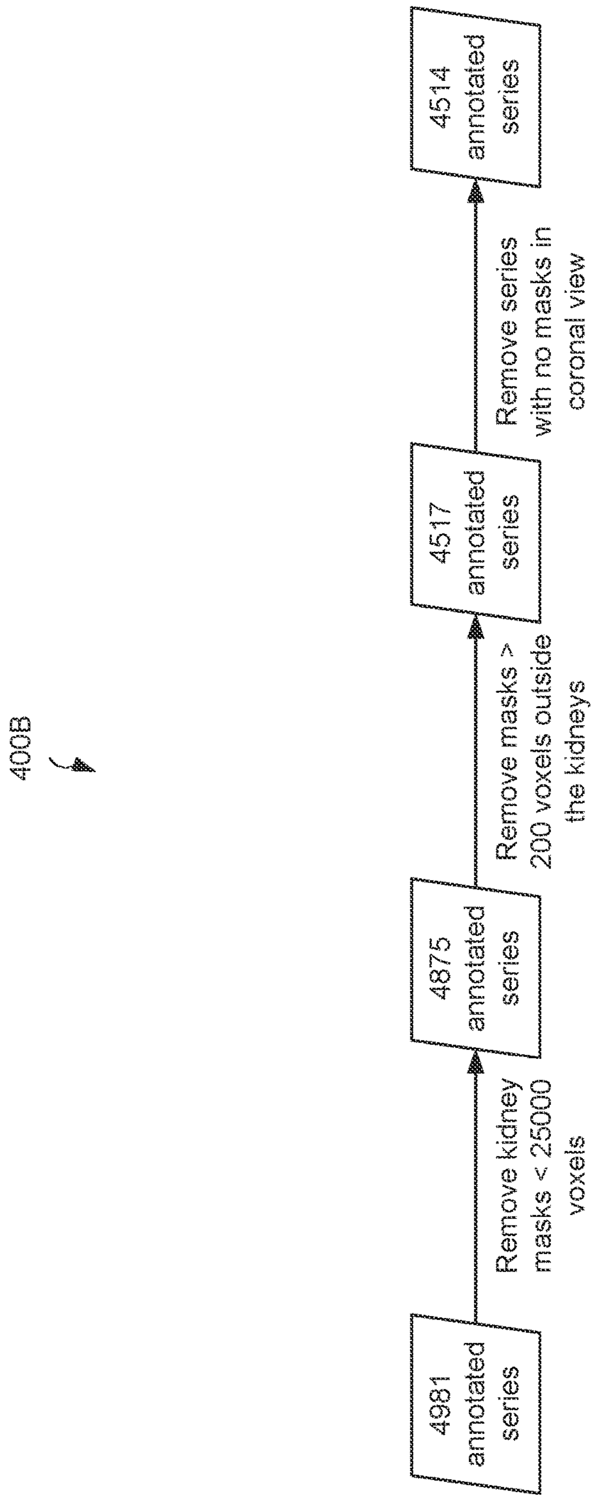
FIG. 4B illustrates an example of quality control filters of the imaging dataset used for the image segmentation model based on the architecture shown in FIG. 3B.

FIG. 4A illustrates an example 400A of quality control filters of an imaging dataset used for the image segmentation model 132A based on the architecture 300A shown in FIG. 3A. The image dataset in this example relates to generation of a TKV (size estimate 131 defining an estimate of total kidney volume). The image segmentation model 132A may be trained in a supervised way with a training dataset from the training data datastore 104. A total of 4981 annotated T1-weighted MRI series were analyzed. For quality control, training data was selected for the training, validation and test portions considering first of all the quality of the kidney masks provided as ground truth and annotated by doctors during training data dataset definition.

Series whose mask had fewer than 25000 voxels belonging to the kidneys were removed, retaining 4875 of the 4981 annotated series. Considering the distribution of the kidneys' pixel number in the whole dataset, 25000 pixels was selected as a proper threshold to exclude incomplete segmentations. Furthermore, series with more than 200 voxels segmented outside the kidneys were excluded, for a total of 4517 maintained series. Series without masks in coronal view were removed. A total of 4514 series were available at the end of the image quality control.

A further filter was then applied, identifying the series for which corresponding vital (e.g. weight, height) and demographic information are unavailable or partially missing. In summary, the imaging data was composed of 4116 annotated MRI T1 series with tabular information available and 398 series with only imaging data. The imaging dataset used for training includes images with noise or other artifacts that are identified in the original training data dataset with a specific flag "IMSUFQU". All n=4116 images passing the quality control filters described in FIG. 4 were considered as training material in order to include even noisy data in the TKV model training dataset. The impact of image quality according to the IMSUFQU flag on TKV model estimation is analyzed in Table 1 and FIGS. 5A and 5B, considering performance for images in training, validation, and test. Notably, the quality control workflow is also providing (a) the stratification in subject subgroups applied in the TKV model training; (b) a filter for demographic and vital variables that are needed by application of the Bayesian model.

TABLE 1

Impact of image quality according to the IMSUFQU flag on TKV model estimation.

| | Training set | Validation set | Test set |
|---|---|---|---|
| Overall TKV Residuals 95% studentized Bootstrap Confidence Intervals | (−48.48, 121.75) | (−442.01, 450.61) | (−247.19, 366.36) |
| Acceptable quality series 95% studentized Bootstrap Confidence Intervals for TKV Residuals | (−98.81, 178.19) | (−679.26, 717.82) | (−281.49, 404.69) |
| Overall TKV residual MAE | 66.233 | 66.136 | 64.038 |
| TKV residuals MAE on Acceptable quality series | 64.353 | 63.347 | 60.147 |
| Overall Dice Scores mean and standard deviation | 0.950 ± 0.026 | 0.947 ± 0.034 | 0.949 ± 0.020 |
| Acceptable Quality Dice Scores mean and standard deviation | 0.952 ± 0.026 | 0.948 ± 0.037 | 0.951 ± 0.017 |

Figure 5A:
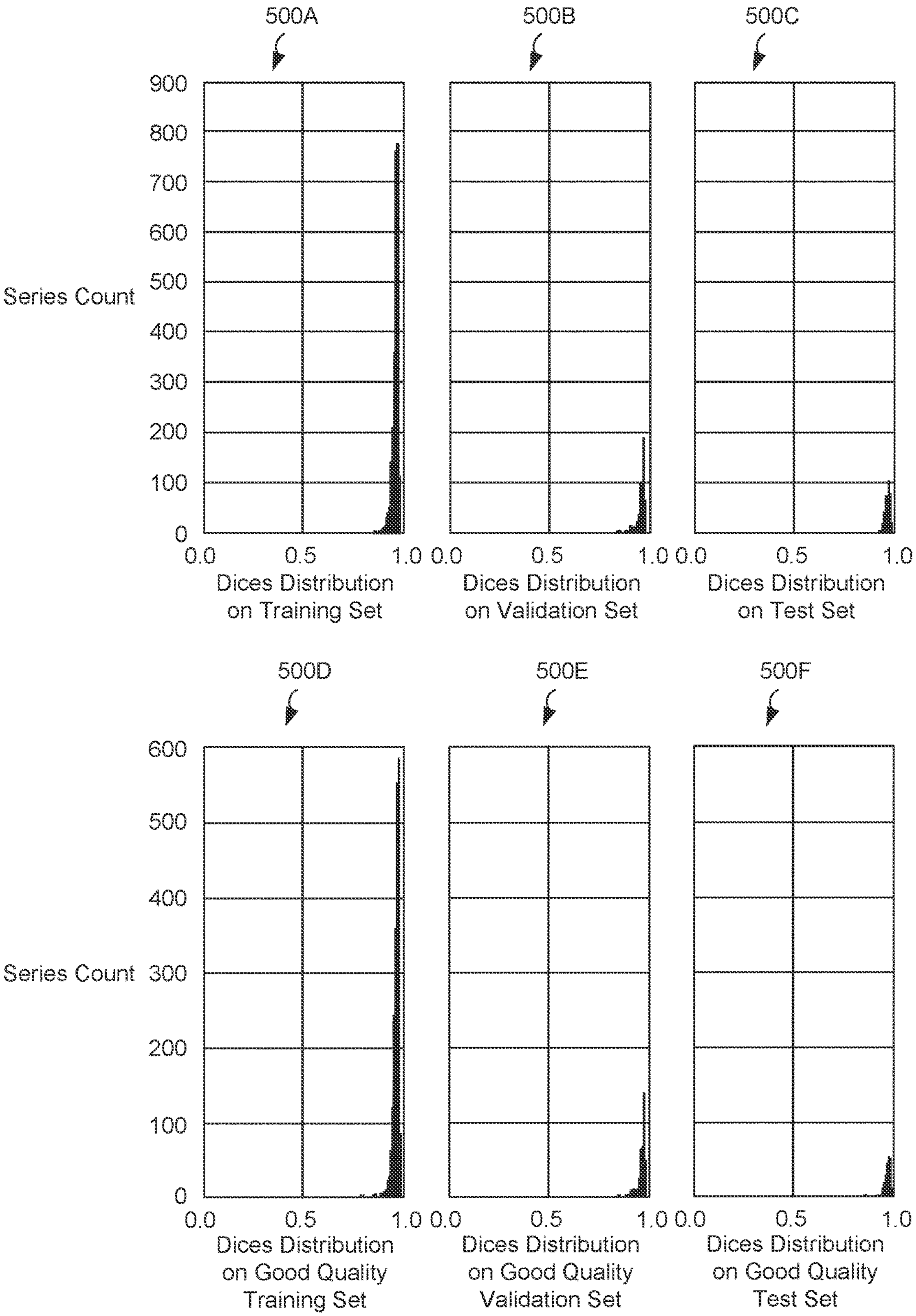
FIG. 5A illustrates an example of Dice score distributions in the training, validation and test series and the corresponding mean and standard deviation.
Figure 6:
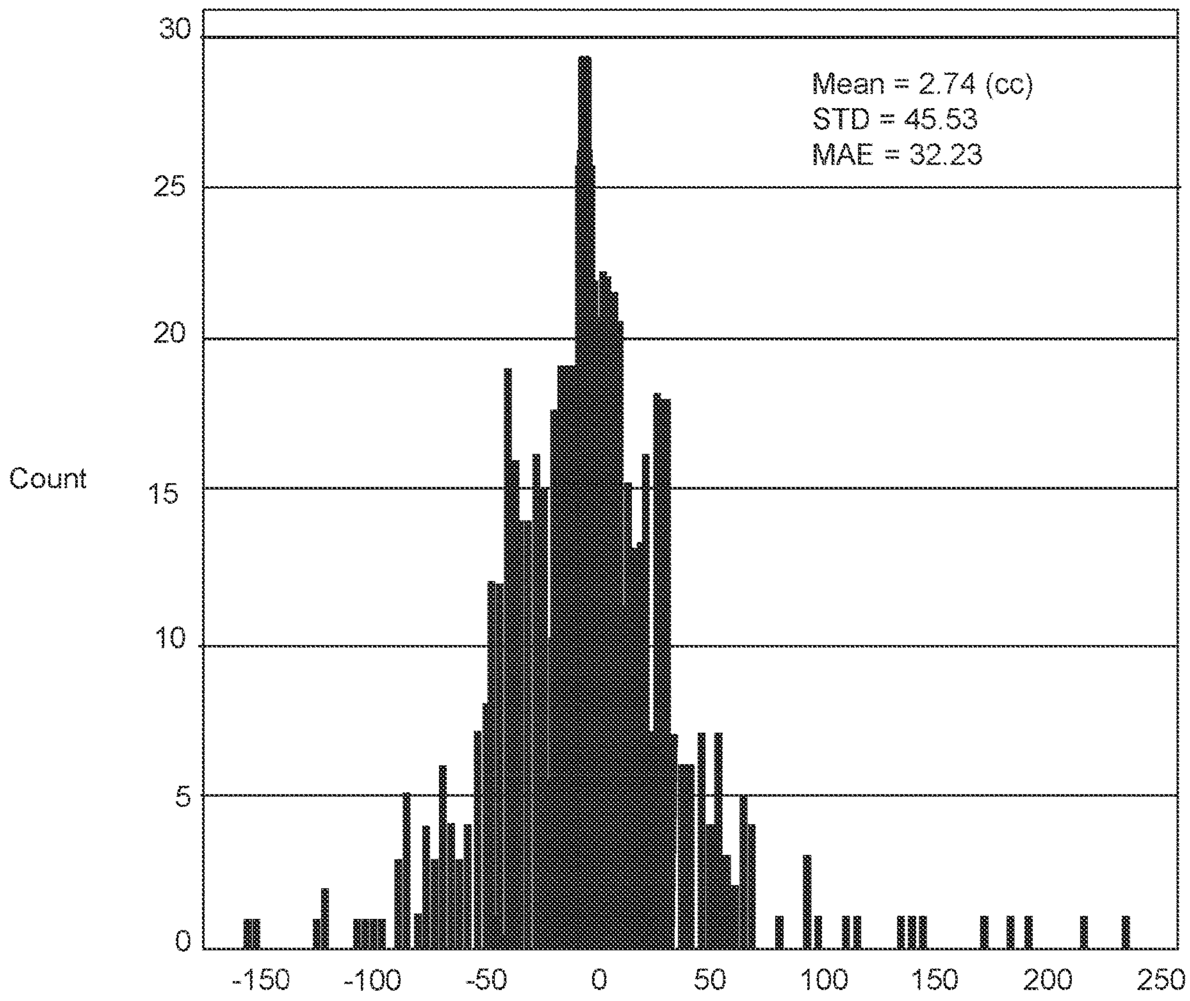
FIG. 6 illustrates an example of a histogram plot of the TKV residuals made by the image segmentation model based on the architecture shown in FIG. 3B.

FIG. 5A illustrates an example of Dice score distributions in the training, validation and test series and the corresponding mean and standard deviation. Dice Index distributions computed on: first row, all images from (a) training set, (b) validation set and (c) test. Second row, only on good quality images from (d) training set, (e) validation set and (f) test set. Dices mean and standard deviations are respectively (a) 0.950±0.026, (b) 0.947±0.034, (c) 0.949±0.020, (d) 0.952±0.026, (e) 0.948±0.037 ed (f) 0.951±0.017.

The available series were divided into training, validation and test sets applying a balanced splitting process, in order to have comparable data distributions in the three subsets. More in detail, the data available after the Quality Control process described in the previous section were grouped by subjects ID and stratified by sex, height-normalized TKV (considered in deciles), image quality parameter available in the original training data and age (as quartiles). Combinations of these variable values were recursively enumerated, in random order. For each of the subject clusters obtained from this process, 80% of the subjects in the cluster were assigned to the training set, 10% to the validation set and 10% to the test set. The selection of subjects to be assigned to each data subset was performed randomly.

For series without tabular data such as height and age, it was not possible to split them by stratification based on such covariates. These series were randomly divided into training, validation and test, respectively in 80:10:10 proportion. All the series from the same subject were kept together and assigned to the same subset to avoid spillover of information from validation or test into the training data (information leakage effects). Finally, all series from the subjects assigned respectively in training, validation and test set in the previous steps were considered separately obtaining 3592 series from 1330 subjects in the training set, 462 from 165 subjects in the validation set and 460 from 165 subjects in the test set.

The image segmentation model 132A was trained using the 3592 series included in the training set, as defined by the data split process described in the previous section. Then 462 series from the validation set were used for model iterative evaluation, while 460 test set series were used for model final testing. All images passing the quality control filters illustrated in FIG. 4 were considered for the model development and validation.

The quality of the volume estimates has been checked by trained technicians. The impact of noise on image was also evaluated by trained technicians and also confirmed by the "IMSUFQU" flag available in the original dataset. The network performance was evaluated considering the Dice score index, which was computed by comparing pixel by pixel the kidney mask provided by the Residual U-Net and that of the clinical trial used as ground truth. Only the two biggest volumes segmented by the network, assumed to be the two kidneys, are used for the computation of the Dice scores. All the other smaller volumes, if present, are removed, coherently with the TKV calculation.

Figure 5B:
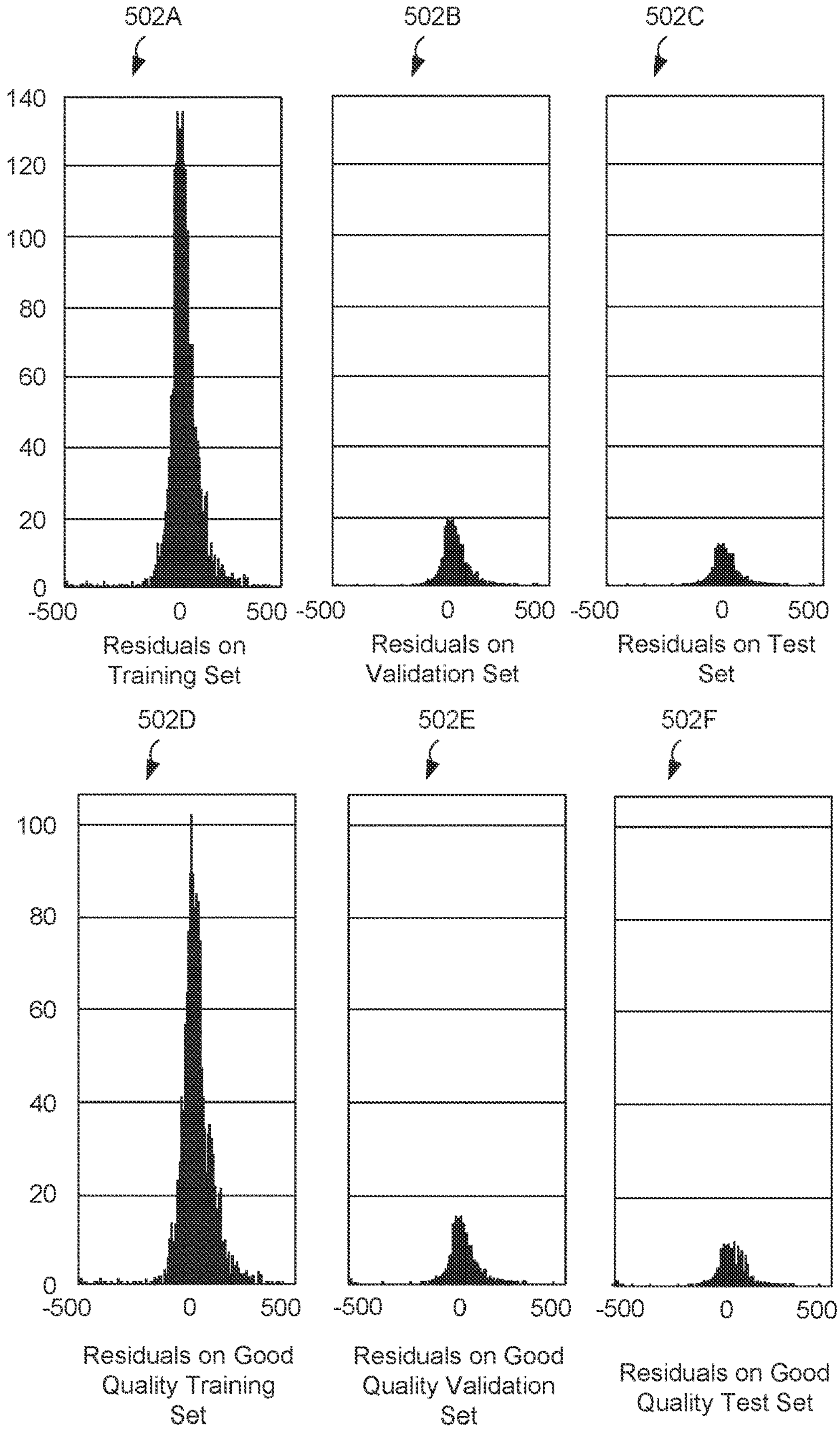
FIG. 5B illustrate examples of distributions of differences between the Total Kidney Volume (TKV) calculated from the segmentation provided by the neural network and the TKV annotation provided in the clinical trial original data.

After a first general learning phase, a fine tuning was later done to improve the model performance in series with cysts in the liver, since these can be considered a confounder for ADPKD kidney segmentation. In the fine tuning procedure, trained technicians have selected 856 MRI series with cysts in the liver among the 3592 series included in the training set and 88 series among the 462 ones from the validation set. At each epoch, balanced batches composed in equal numbers from series with cysts in the liver and series without cysts in the liver were given in input to the neural network. The distribution of differences between the TKV calculated from the segmentation provided by the neural network and the TKV annotation provided in the clinical trial original data are shown in FIG. 5B. FIG. 5B illustrates examples of TKV Residual distributions 502A-502F. Distribution 502A is based on all images in the training set, distribution 502B is based on all images in the validation set, and distribution 502C is based on all images in the test set. Distribution 502D is based on only good quality (based on a subject or objective factors for quality) images in the training set, distribution 502E is based on only good quality images in the validation set, and distribution 502F is based on only good quality images in the test set. Mean and [95% studentized Bootstrap Confidence Intervals] in the six data subsets are respectively: for 502A (36.1, [−48.48, 121.75]), for 502B: (24.0, [−442.01, 450.61]), for 502C: (48.9, [−247.19, 366.36]), for 502D: (46.1, [−98.81, 178.19]), for 502E: (21, [−679.26, 717.82]), and for 502F: (46.1, [−281.49, 404.69]).

FIG. 3B illustrates example of another architecture 300B of an image segmentation model 132B. In this example, the image segmentation model 132B is generated by an nnU-Net framework based on a training dataset from the training data datastore 104.

The image segmentation model 132B works with a sliding window approach, in which the window size equals the patch size used during training. It takes input patch images of 40×224×224 voxels at the input layer 551 of FIG. 3B and returns segmentation maps of the same voxels at the output layer 553. A final segmentation map is reconstructed by stitching those adjacent segmentation maps of the 40×224×224 voxels with overlaps by half of the size of a patch, i.e., 20×112×112 voxels. The segmentation map is represented by a 3D array of 0 and 1 where 1 means kidney and 0 means the others.

More specifically, each patch image of 40×224×224 voxels goes through several computational blocks in a hierarchical manner. Each computational block includes a sequence of 1×3×3 convolution, instance normalization (IN), and leaky rectified linear unit (leaky ReLU) operation or a sequence of 3×3×3 convolution, instance normalization, and leaky rectified linear unit operation. In the expansive path or, equivalently, the decoder, it can also include a sequence of 1×1×1 convolution and SoftMax operation.

In the contracting path or, equivalently, the encoder, patch images should go through two consecutive computational blocks per resolution stage and then add to the expansive path of the same resolution stage. At the same time, the output goes deeper with the number of features being doubled by 32→64→128→256 and saturated with 320. With down-sampling strides being [2, 2, 2], the resolution of patch images is halved along all axes. With down-sampling strides being [1, 2, 2], the resolution of patch images is halved along only x- and y-axis.

The image segmentation model 132B works with T1-weighted MRI images and, for best performance, needs to take input image data such that each slice size be 256×256, the number of slices be 25 to 75, in-plane spacing be 1.25 to 1.75 mm, and out-plane spacing be 4.0 mm.

Table 2 shows a summary of functional description of an image segmentation model 132B based on the architecture 300B.

| Function | Description |
|---|---|
| Output/Outcome | Kidney image segmentation as 3D binary map (1 for voxels that belong to the kidneys, 0 otherwise). |
| Target population | The Computer system 120, in which the model 132 is included, is indicated for use with patients who are 18 years |

-continued

| Function | Description |
|---|---|
| | or older, diagnosed with typical ADPKD (standard criteria) and who have at least 1 MRI scan of their kidneys. |
| Time of prediction/estimate | At time of visit/real time |
| Input data source | MRI series saved as DICOM files will be entered by the user. |
| Input data type | The model 132 may require 3D image NIfTI files (nii.gz), as converted from MRI T1-weighted with no fat saturation in DICOM standard. |
| Preprocessing pipeline | Resample images to have slices of 256 × 256 pixels and a 4 mm spacing in Z direction.<br>Median absolute deviation normalization.<br>Add empty slices to make the number of slices divisible by 16 |
| Postprocessing | Prediction binarization (voxel values ≥ 0.5 are set equal to 1, otherwise 0). |
| Training data location | Training data, such as the TEMPO 3:4 clinical trial |
| Model Type | 3D U-Net (model 132) as configured and trained by nnU-Net |

The nnU-Net framework may determine parameters that are used with the values for an image segmentation model 132B. The parameters may include fixed parameters, rule-based parameters, and empirical parameters. Fixed parameters may not require adaptation between datasets and become a common configuration across medical image datasets. Fixed parameters may include learning rate, loss function, architecture template, optimizer, data augmentation, training procedure, and inference procedure. Rule-based parameters may be formulated as explicit dependencies between dataset fingerprint and pipeline fingerprint as given in the form of heuristic rules. Fixed parameters may include intensity normalization, image resampling strategy, annotation resampling strategy, image target spacing, network topology, patch size, batch size, trigger of 3D U-Net cascade, and configuration of low-resolution 3D U-Net. Empirical parameters are decision parameters that are neither given as fixed parameters nor formulated as rule-based parameters. They are configuration of post-processing and ensemble selection, which may be empirically determined.

Table 3 shows examples of fixed parameters.

model 132B. 3D cascades U-Net is targeted towards large data case. Coarse segmentation maps are learned and then refined.

nnU-Net may not make use of sophisticated architectural variations, such as residual connections, dense connections, attention mechanisms, or dilated convolutions. It may be difficult to estimate which U-Net configuration among these three architectures performs best for a given dataset. Thus, the particular configuration may be selected based on performance.

To enable large patch sizes, the batch size of the networks in nnU-Net is small. Batch normalization is usually used to speed up or stabilize training, but instance-based normalization is used by first subtracting its mean and then dividing by its standard deviation. Rectified Linear Unit (ReLU) is replaced with leaky ReLU (negative slope, 0.01). The order of operations in each computational block is convolution-instance normalization (IN)-leaky ReLU. Two computational blocks per resolution stage in both encoder and decoder are used. Down-sampling is done with strided convolutions (the convolution of the first block of the new

| Design choice | Required input | Automated configuration derived by distilling expert knowledge |
|---|---|---|
| Learning rate | — | Poly learning rate schedule (initial, 0.01) |
| Loss function | — | Dice and cross-entropy |
| Architecture template | — | Encoder-decoder with skip-connection ('U-Net-like') and instance normalization, leaky ReLU, deep supervision (topology-adapted in inferred parameters) |
| Optimizer | — | SGD with high initial learning rate ($\eta$ = 0.01) and Nesterov momentum ($\mu$ = 0.99) |
| Data augmentation | — | Rotations, scaling, Gaussian noise, Gaussian blur, brightness, contrast, simulation of low-resolution gamma correction, and mirroring |
| Training procedure | — | 400 epochs × 1796 minibatches, foreground oversampling |
| Inference procedure | — | Sliding window with half-patch size overlap, Gaussian patch center weighting |

The architecture template: U-Net architectures configured by nnU-Net may include 2D U-Net, 3D U-Net, and 3D cascades U-Net. 2D U-Net runs on full resolution data and is expected to work well on anisotropic data. If a given dataset fits right into maximum axis spacing/minimum axis spacing ≥3, they are considered as anisotropic data. The TEMPO 3:4 study image data are isotropic data. 3D U-Net runs on full resolution data and gives the best performance overall. This was finally selected for the image segmentation resolution has stride >1) and upsampling may be performed with convolutions transposed.

Training Procedure: nnU-Net suggests that all trainings run for a fixed length of 1000 epochs, where each epoch is defined as 250 training iterations. Fewer epochs usually result in diminished segmentation performance. But they were adapted for TEMPO 3:4 dataset with one epoch being defined as iteration over the whole 3592 training series and 1000 epochs being reduced into 400 epochs. Each training sample was used by 400 times while the default method suggests that each training sample is used by 139.2 times on average. As for the optimizer, Stochastic Gradient Descent (SGD) with a high initial learning rate ($\eta$=0.01) and a large Nesterov momentum ($\mu$=0.99) is used.

The learning rate is reduced during the training using the 'polyLR' schedule. Data augmentations are run on the fly with associated probabilities to obtain a never-ending stream of unique examples. Used augmentation technics are rotations, scaling, Gaussian noise, Gaussian blur, brightness, contrast, simulation of low resolution, gamma correction, and mirroring.

The loss function is the sum of cross-entropy and Dice loss. For each deep supervision output, a ground truth segmentation mask is down-sampled for loss computation.

Inference Procedure: Validation sets of all folds in the cross-validation are predicted by the single model trained on the respective training data. The 5 models resulting from training on 5 individual folds are subsequently used as an ensemble for predicting test cases. Inference is done patch based with the same patch size as used during training. Fully convolutional inference is not applied because it causes issues with zero-padded convolutions and instance normalization. To prevent stitching artifacts, adjacent predictions are overlapped by the halved patch size. Predictions towards the border are less accurate. To alleviate it, Gaussian importance weighting is used for SoftMax aggregation (the center voxels are weighted higher than the border voxels).

Table 4 shows examples of rule-based parameters.

is the number of down-sampling operations (5 per down-sampling stems from 2 convolutions in the encoder, 2 convolutions in the decoder plus the convolution transpose). For the model AIM-AI-TKV-V2, the number of down-sampling operations is k=5 and the number of convolutional layers is 27 as directly counted (shown in FIG. 3B). Additional loss functions are applied to all but the two lowest resolutions of the decoder to inject gradients deep into the network.

For anisotropic data, pooling is first exclusively performed in-plane until the resolution matches between the axes. Initially, 3D convolutions use a kernel size of 1 (making them effectively 2D convolutions) in the out of plane axis to prevent aggregation of information across distant slices. Once an axis becomes too small, down-sampling is stopped individually for this axis.

Configuration of the Input Patch Size

The input patch size should be as large as possible while still allowing a batch size of 2 under a given memory constraint, such as a Graphical Processing Unit (GPU) memory constraint. This maximizes the context available for decision making in the network. Aspect ratio of patch size follows the median shape (in voxels) of resampled training cases. Batch size is configured with a minimum of 2 to ensure robust optimization, since noise in gradients increases with fewer sample in the minibatch. If GPU memory headroom is available after patch size configuration, the batch size is increased until GPU memory is maxed out.

| Design choice | Required input | Automated configuration derived by distilling expert knowledge |
|---|---|---|
| Intensity normalization | Image modality, intensity distribution | If CT, global dataset percentile clipping & z score with global foreground mean and Standard Deviation (SD). Otherwise, z score with per image mean and SD. |
| Image resampling strategy | Distribution of spacings | If anisotropic, in-plane with third-order spline, out-of-plane with nearest neighbor. Otherwise, third-order spline. |
| Annotation resampling strategy | Distribution of spacings | Convert to one-hot encoding → If anisotropic, in-plane with linear interpolation, out-of-plane with nearest neighbor. Otherwise, linear interpolation. |
| Image target spacing | Distribution of spacings, median shape | If anisotropic, lowest resolution axis tenth percentile, other axes median. Otherwise, median spacing for each axis. (computed based on spacings found in training cases. |
| Network topology, patch size, batch size | Median resampled shape, target spacing, GPU memory limit | Initialize the patch size to median image shape and iteratively reduce it while adapting the network topology accordingly until the network can be trained with a batch size of at least 2 given GPU memory constraints. for details see online methods. |
| Trigger of 3D U-Net cascade | Median resampled image size, patch size | Yes, if patch size of the 3D full resolution U-Net covers less than 12.5% of the median resampled image shape. |
| Configuration of low-resolution 3D U-Net | Low-res target spacing or image shapes, GPU memory limit | Iteratively increase target spacing while reconfiguring patch size, network topology and batch size (as described above) until the configured patch size covers 25% of the median image shape. For details, see online methods. |

Dynamic Network Adaptation

The network architecture needs to be adapted to the size and spacing of the input patches seen during training. This is necessary to ensure that the receptive field of the network covers the entire input. Down-sampling is performed until the feature maps are relatively small (minimum is (4×) 4×4) to ensure sufficient context aggregation. Due to having a fixed number of blocks per resolution step in both the encoder and decoder, the network depth is coupled to its input patch size. The number of convolutional layers in the network (excluding segmentation layers) is (5×k+2) where k Target Spacing and Resampling For isotropic data, the median spacing of training cases (computed independently for each axis) is set as default. Resampling with third order spline (data) and linear interpolation (one hot encoded segmentation maps such as training annotations) give good results. For anisotropic data, the target spacing in the out of plane axis should be smaller than the median, resulting in higher resolution to reduce resampling artifacts. To achieve this, the target spacing is set as the 10th percentile of the spacings found for this axis in the training cases. Resampling across the out of plane axis is done with nearest neighbor for both data and one-hot encoded segmentation maps.

Intensity Normalization

Z-score per image (mean subtraction and division by standard deviation) may be used as a default. This default is deviated for CT images, where a global normalization scheme is determined based on the intensities found in foreground voxels across all training cases.

Table 5 shows examples of empirical parameters.

| Design choice | Required input | Automated configuration derived by distilling expert knowledge |
|---|---|---|
| Configuration of post-processing | Full set of training data and annotations | Treating all foreground classes as one; does all-but-largest-component-suppression increase cross-validation performance? Yes, apply; reiterate for individual classes No, do not apply; reiterate for individual foreground classes |
| Ensemble selection | Full set of training data and annotations | From 2D U-Net, 3D U-Net or 3D cascade, choose the best model (or combination of two) according to cross-validation performance |

Model Selection

While the 3D full resolution U-Net shows overall best performance, selection of the best model for a specific task at hand cannot be predicted with perfect accuracy. Therefore, nnU-Net generates three U-Net configurations and automatically picks the best performing method (or ensemble of methods) after five cross-validations. The image segmentation model 132B may use the 3D full resolution U-Net.

Postprocessing

Often, particularly in medical data, the image contains only one instance of the target structure. This prior knowledge can often be exploited by running connected component analysis on the predicted segmentation maps and removing all but the largest component. Whether to apply this postprocessing is determined by monitoring validation performance after cross-validation. Specifically, postprocessing is triggered for individual classes where the Dice score is improved by removing all but the largest component. The image segmentation model 132B may not use this postprocessing because two kidneys are mostly detected in the coronal view.

Data Pre-Processing for the Image Segmentation Model 132B

The correct classification of outcomes and features of the TEMPO 3:4 dataset has been performed in the original clinical study, which is the established reference work. The available series were divided into training, validation, and test datasets by applying a balanced splitting process to have comparable data distributions over the three subsets. The data available after the quality control process were grouped by patients ID and stratified by sex, height normalized TKV (considered in deciles), image quality parameter available in the original TEMPO 3:4 data and age (as quartiles). All the combinations of these variables' values were recursively enumerated, in random order. For each of the patient clusters obtained from this process, 80% of the patients in the cluster were assigned to the training set, 10% to the validation set and 10% to the test set. The selection of patients to be assigned to each data subset was performed randomly.

The total number of files are 4514, which is the sum of 3592 nrrd files of training image data, 462 nrrd files of validating image data, and 460 nrrd files of testing image data. Another three datasets of the same number having those corresponding mask images were used. The total number of files are 4514, which is the sum of 3592 nrrd files of training mask data, 462 nrrd files of validating mask data, and 460 nrrd files of testing mask data. 9028 nrrd files of images and masks were converted to nifti files, which are necessary for running the nnU-Net model.

For series without tabular data such as height and age, it was not possible to split them by stratification based on such covariates. These series were randomly divided into training, validation, and test, respecting the proportion of 80%-10%-10%. All the series from the same patient were kept together and assigned to the same subset to avoid spillover of information from validation or test into the training data (information leakage effects).

Data Cleaning

Real time data would have lot of abnormalities, missing values and features with incorrect format/scales, integrate or handling redundancies. Data cleaning is required to format and transform the data to a standard format in a data frame with no abnormalities. Data frame needs to be understood on the rows and columns of the data and the data types and values of each column E.g; Represent in graphical way how the raw data has been filtered to derive quality dataset.

Evaluate and define data wrangling, exploration & cleaning—Structured vs Unstructured. Evaluate and define Data Preprocessing steps to organize selected data by formatting, cleaning, and sampling from it.

Load the dataset into the target data source or data warehouse or cloud or provide path prefixed within the function.

Note: Data Cleaning activities are mostly handled manually and consumes lot of time and coding skills such as Python & Pandas. >>

The image dataset acquired from the Otsuka sponsored clinical trial TEMPO 3:4 (156-04-251; Study ID #251) has a total of 4981 annotated T1-weighted MRI series. Real data would have some abnormalities, missing values, or features. As a data cleaning process, the following quality control process was applied.

Quality Control

FIG. 4B illustrates an example 400B of quality control filters of the imaging dataset used for the image segmentation model 132B based on the architecture shown in FIG. 3B. training datasets from the training data datastore 104 (such as TEMPO 3:4 series data) were selected for the training, validating, and testing portions considering the quality of the kidney masks provided as ground truth and annotated by the doctors during the training dataset definition. Series whose mask had fewer than 25,000 voxels belonging to the kidneys were removed, retaining 4875 of the 4981 annotated series. Considering the distribution of the kidneys' pixel number in the whole dataset, 25,000 voxels was selected as a proper threshold to exclude incomplete segmentations. Furthermore, series with more than 200 voxels segmented outside the kidneys were excluded, for a total of 4517 maintained series. Series without masks in coronal view were removed. A total of 4514 series are finally available for being used for the model training, validating, and testing.

Training Dataset Attributes

Slices have 256×256 in-plane size. Mean slice number: 46.30. Min slice number: 20. Max slice number: 144. Mean spacing: [1.459, 1.459, 3.964]. Note that not all samples have a 4 mm out-plane spacing.

Test Dataset Attributes

Mean slice number: 47.42. Min slice num: 25. Max slice num: 132.

Data Augmentation 3592 training images together with 3592 masks, as described above, are not sufficient for training a deep learning model. nnU-Net pipeline provides data augmentation protocol and runs it during the model training.

Table 6 illustrates examples of data augmentation parameters that were used during model training.

| Configuration parameters | Values |
|---|---|
| Median image shape at target spacing: | 44 × 256 × 256 (voxels) |
| Target spacing: | 4. × 1.36719 × 1.36719 (mm) |
| Patch size: | 40 × 224 × 224 (voxels) |
| Batch size: | 2 |
| Down-sampling strides: | [[1, 2, 2], [2, 2, 2], [2, 2, 2], [2, 2, 2], [1, 2, 2]] |
| Convolution kernel sizes: | [[1, 3, 3], [3, 3, 3], [3, 3, 3], [3, 3, 3], [3, 3, 3], [3, 3, 3]] |
| Number of pooling per axis: | [3, 5, 5] |

The median image size of the dataset as computed for each axis independently is 44×256×256 voxels at a spacing of 4×1.36719×1.36719 mm. nnU-Net normalizes all images individually by subtracting their mean and dividing by their standard deviation. The target spacing for the 3D U-Net was determined to be 4.×1.36719×1.36719 mm, which exactly corresponds to the median voxel spacing. Because the median spacing is close to be isotropic, which is defined to mean maximum axis spacing/minimum axis spacing<3, nnU-Net does not use the 10th percentile for the out of plane

| Name | Description | Parameters |
|---|---|---|
| Rotation | | Ranges: rotation_x = (−0.5236, 0.5236) rotation_y = (−0.5236, 0.5236) rotation_z = (−0.5236, 0.5236) |
| Scaling | | scale_range = (0.7, 1.4) independent_scale_factor_for_each_axis = False |
| Gaussian Noise | additive Gaussian Noise | |
| Gaussian Blur | Gaussian blur | blur_sigma = (0.5, 1.) |
| Brightness Multiplicative | Augments the brightness of data. | multiplier_range = (0.75, 1.25) |
| Contrast Augmentation | Augments the contrast of data. | |
| Simulate Low Resolution | Downsamples each sample (linearly) by a random factor and upsamples to original resolution again (nearest neighbor). | zoom_range = (0.5, 1) |
| Gamma | Augments by changing ‘gamma’ of the image (same as gamma correction in photos or computer monitors). | gamma_range = (0.7, 1.5) invert_image = False |
| Gamma | | gamma_range = (0.7, 1.5) invert_image = True |
| Mirror | Randomly mirrors data along specified axes. Mirroring is evenly distributed. Probability of mirroring along each axis is 0.5. | mirror_axes = (0, 1, 2) |

Model Outcome

The dataset is composed of 1254 MRI series from baseline, 817 MRI series from 12th month, 757 MRI series from 24th month, and 711 MRI series from 36th month, while 53 series have been acquired without respecting the annual rate (early termination or unscheduled series). The training dataset series have been obtained from a total of 1130 subjects. An additional 462 and 460 series from the TEMPO 3:4 study was used for model iterative evaluation and final testing, respectively. Both the validation and test set have been obtained from 165 subjects. Subjects and images from the TEMPO 3:4 study is not used for either analytical or clinical validation.

Table 7 illustrates examples of model configurations generated by nnU-Net for the image segmentation model 132B.

axis. The resampling strategy is decided on a per-image basis. Isotropic cases are resampled with third order spline interpolation for the image data and linear interpolation for the segmentations. Segmentation maps are always converted into a one hot representation prior to resampling which is converted back to a segmentation map after the interpolation.

Table 8 illustrates an example of a distribution of DICE scores on TEMPO 3:4 test image dataset.

| Percentile | DICE score |
|---|---|
| Min | 0.909044 |
| $5^{th}$ percentile | 0.943504 |
| $10^{th}$ percentile | 0.948233 |
| $25^{th}$ percentile | 0.955497 |
| $50^{th}$ percentile | 0.962950 |

-continued

| Percentile | DICE score |
|---|---|
| $75^{th}$ percentile | 0.968520 |
| $90^{th}$ percentile | 0.972851 |
| $95^{th}$ percentile | 0.974794 |
| Max | 0.979308 |

After resampling, the median image shape is 44×256×256 voxels. nnU-Net prioritizes a large patch size over a large batch size to capture as much contextual information as possible. These are coupled under a given GPU memory budget. The 3D U-Net is thus configured to have a patch size of 40×224×224 voxels and a batch size of 2, which is the minimum allowed according to nnU-Net heuristics (the size of 40×224×224 was designed so that it can be factorized into $(5\times2^3)\times(7\times2^5)\times(7\times2^5)$ while it is close to the median image size. The exponent size of 5×7×7 is the resolution in the deepest layer). Since the input patches have anisotropic spacing, the first convolutional kernel size and the first and last down-sampling strides are anisotropic (1×3×3 and 1×2×2, respectively).

FIG. 6 illustrates an example of a histogram plot 600 of the TKV residuals made by the image segmentation model 132B based on the architecture 300B shown in FIG. 3B. The direct measure that was used during the training is the sum of cross entropy and Dice loss. For 460 test series of TEMPO 3:4 image data, the model AIM-AI-TKV-V2 has the Dice scores listed in Table. All the test images have a Dice score bigger than 0.9 and the mean Dice score is 0.961479. When the segmented voxels were converted to the physical volume in terms of TKV, the error distribution of TKVs compared to the ground truth TKVs is given as a histogram plot 600.

Predicting a Future Size of the Target Object Via Machine Learning-Based Models

Figure 7:
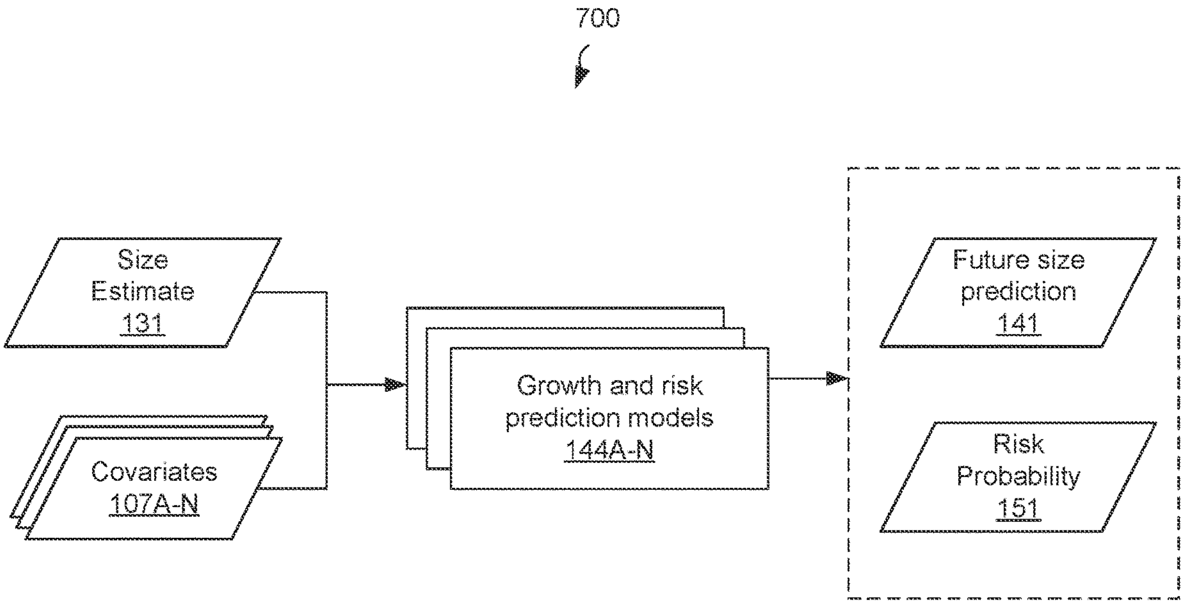
FIG. 7 illustrates an example of a flow diagram for predicting a future size and associated risk probability using machine learning-based modeling.

Referring to FIG. 7, the future size prediction subsystem 140 may take as input the size estimate 131 and one or more covariates 107 to generate one or more future size predictions 141 and associated risk probabilities 151. A future size prediction 141 may include an annualized (or other time interval) rate of change in size of the target object 105 after a time period of time such as a number of months and a probability that the annualized rate will exceed 5%.

Based on the probability, the subject may be classified into a risk class given in N levels or a binary way, where N is an integer such as three. The annualized rate of change in size may be normalized based on a value of a covariate. For example, in examples in which the future size prediction 141 relates to an annualized growth rate of a kidney, the future size prediction 141 may be normalized based on a height of the subject. This is because the height of the subject being assessed may alter the growth rate of the kidney. For example, taller subjects may generally have higher kidney growth rates than shorter subjects. To account for these differences, the future size prediction may be normalized so that, for example, taller subjects are not erroneously flagged as having a larger than expected growth rate (which may result in a false positive risk assessment for the subject) and/or shorter subjects are not erroneously flagged as having a smaller than expected growth rate (which may result in a false negative risk assessment for the subject). For similar reasons, other covariates may be used to normalize the predictions as well or instead.

The future size prediction subsystem 140 may use one or more growth and risk prediction models 144 trained to predict a future size based on a size estimate and covariates relating to the subject. The covariates may include height, weight, gender, age, clinical lab results, and/or other attributes of the subject that was imaged in the source image 103 from which the size of the target object 105 was estimated.

Each of the growth and risk prediction models 144 may be respectively based on a number of available size estimates 131 from which to make a future size prediction. For example, a first growth and risk prediction model 144A may be based on a single baseline size estimate determined for the subject at a first time. A second growth and risk prediction model 144B may be based on the baseline size estimate 131 of the target object 105 determined for the subject at the first time and also a subsequent size estimate 131 of the target object 105 determined for the subject at a second time after the first time. For instance, the subject may have had an MRI image (a first source image 103) taken at the first time and then 12 months later have a second MRI image (a second source image 103) taken at the second time. Other time intervals (other than 12 months) may be available, and other numbers of time intervals (other than first and second time instances) may be available. For example, a third growth and risk prediction model 144N may use both the baseline size estimate, the subsequent size estimate, and a third size estimate based on a source image of the target object 105 determined for the subject at a third time. Generally speaking, more available size estimates may result in better, more reliable, predictions.

Various modeling techniques may be used to train the growth and risk prediction models 144 to predict a future size. One example includes a Bayesian linear regression that is used to generate the future size estimate 141. The risk prediction in this example is based on Bayesian models that explicitly compute probability distributions of the expected change in height-normalized TKV (htTKV) over time. The annualized htTKV change is then summarized in a 2-level risk score to obtain an easy to interpret evaluation of the risk of rapid progression (unable to determine/high-risk) computed from the likelihood of annualized TKV >5% growth rate prediction.

In examples that follow, a first growth and risk prediction model 144A may be referred to as a baseline model (M1) and a second growth and risk prediction model 144B may be referred to as a 12 month model (M2) for clarify. M1 and M2 may be respectively applied at a first visit or after 12 months, according to availability of imaging and clinical data. Other time periods may be used as well. Model M1 is used at the first examination of the subject, while M2 uses in addition the data coming from a second examination made 12 months after the first one. Other numbers of examinations and corresponding imaging may be used as well, resulting in models M3 and so forth. The intermediate outputs of the model are (i) the annualized % htTKV change at 36 months, which is derived as a normalization of the estimated annualized htTKV change at 36 months divided by the htTKV calculated at baseline. For each subject, the model also produces (ii) a posterior distribution associated with the annualized % htTKV point estimate. The posterior distribution is compared with the 5% rapid progressor threshold, the area under the curve proportion at the right of the 5% threshold is estimated and binned in 2 classes ("unable to determine" vs "high"), ultimately defining a likelihood of TKV >5% growth rate prediction.

The single MRI image model M1 uses a single baseline TKV measurement and other baseline clinical variables, namely age, sex, weight, height and blood serum creatinine, while the two MRI image model M2 uses the baseline measurements plus TKV, weight, and serum creatinine measurements at 12 months. The M2 model incorporates the additional covariates to estimate a growth trend, thus obtaining a more accurate prediction. For clarification, the algorithm formulas are provided in Table 9.

Table 9 shows example parameters used in training the AI-BM Bayesian regression models. A total of 1000 models is run during model estimation within a Data Analysis Plan (DAP) implementing a repeated cross-validation framework, thus relatively shorter Markov chains are used for speed up. Once the model is finalized, the Bayesian model is estimated on all data (fitAll) with longer Markov chains; (a) The step size for adapt_delta used by the numerical integrator is a function of adapt_delta; increasing adapt_delta will result in a smaller step size and fewer divergences. Increasing adapt_delta will typically result in a slower sampler, but more robust sampler. (b) Maximum depth of the trees (max_tree_depth) that is evaluated during each iteration by the sampler.

prediction is discussed in Subsection 4.3, also clarifying the role of the input features. The model will provide as output a risk classification representing the likelihood of an annualized TKV >5% growth rate.

M1 and M2 and corresponding statistical procedures may be implemented in the R statistical framework. M1 and M2 may be fitted with the 'brms' library, which is widely used as an interface to the STAN modeling language. Gaussian priors were used for both M1 and M2 models by setting hyperparameters with empirical values to reduce the posterior distributions variability. The software uses the Markov Chain Monte Carlo (MCMC) algorithm to obtain the parameter posterior distributions and then the average value of these posteriors are taken as the final estimate of the regression coefficients, as well as of the variance of the estimates. In the test, point estimates and posterior distributions are computed for novel points, from which the area-based risk scores are derived.

| Parameter | Value |
|---|---|
| M1 Equations | ΔHt Volume36~HtVolumeBaseline + Age + Sex + CreasBaseline + corrHt Volume_Wtkg_Baseline<br>sigma = HtVolumeBaseline |
| M2 Equations | ΔHtVolume36~ΔHtVolume12 + HtVolumeBaseline + Age + Sex + ΔCreas12 + corrHtVolume_Wtkg_Baseline<br>sigma = HtVolume12 |
| Number of Markov chains | 4 |
| Number of total iterations per chain(*) | 5000 (for each run in the model estimate framework DAP); 15,000 (fit of selected model: fitAll) |
| Warmup iterations (*) | 2500 (DAP); 7500 (fitAll) |
| adapt_delta[a] | 0.99 |
| max_tree_depth[b] | 13 |

The Bayesian model formulas and the main parameters are detailed in Table 9. The variables in the Bayesian model formulas may include: ΔHtVolume36: annual growth of height-normalized TKV (dependent/outcome variable), HtVolumeBaseline: height normalized TKV at baseline visit, Age: age at baseline visit, Sex: biological sex (Male: 0, Female: 1), CreasBaseline: eGFR from Creatinine value at baseline, corrHtVolume_Wtkg_Baseline: height-normalized TKV at baseline, normalized by an adjusted body weight. The adjustment of weight at baseline was calculated by subtracting out kidney weight, assuming a tissue density equal to that of water (1 g/cm3), thus removing the contribution of kidney size (requires: height, HtVolumeBaseline, Weight at baseline), sigma: residual standard deviation of the model, ΔHtVolume12: ht Volume change between 12 month and baseline visits (requires: HtVolumeBaseline and HtVolume_12, i.e. HtVolume at 12 months), ΔCreas12: creatinine change between 12 month and baseline visits (requires: CreasBaseline and Creas_12, i.e. Creatinine at 12 months).

In the model, input TKV values at baseline and 12 months are those predicted by the models M1 or M2. The dependent variable is computed from the volumes estimated by the radiologists (ground truth: GT). Note that the formula also requires the availability of Height at baseline, and of Weight and serum creatinine at both baseline and 12 months.

Interpretability: As an advantage with respect to more complex Machine Learning models, the M1 and M2 are obtained by linear regression, and thus they have a direct interpretability. The importance of each input feature on the Bayesian modeling used by M1 and M2 explicitly models probability distributions of the expected change in htTKV over time. The modeling can also provide marginal probability distributions of the outcome variable (annualized change in height normalized TKV) on each clinical variable used. In addition, sigma, the residual model standard deviation, is predicted as a parameter of the response distribution for each point.

Data Selection and Analysis

Tabular data from the training data was analyzed, considering the subjects that were administered placebo. After quality control for image quality and outlier detection, a dataset containing n=387 subjects in the Placebo arm of the trial, each with clinical features was available longitudinally at baseline and later points 12 and 36 months. The estimated TKV (size estimate 131) was added to the dataset.

Data preprocessing strategy—data preprocessing included detection of outliers, imputation and normalization. Outliers detection was performed on the annualized htTKV change at 36 months (dependent variable/outcome) of the performed models (M1, M2) as well as on the clinical and demographic features included in the models. In detail, values exceeding the 95th percentile of the distribution of each variable were considered as outliers and excluded by further analyses. In particular, nine subjects were excluded as outliers of the distribution of the main predictors included in the model M1 and M2, two cases were excluded as outliers of the distribution of the annualized htTKV change at 36 months and four outliers from the distribution of htTKV change at 12 months.

Imputation was performed at training time. Missing data of interest for the model regarded a small fraction of the dataset (3.6% of subjects) for the 12 Month TKV, baseline serum creatinine, 12 months serum creatinine, and weight. Imputation was manually applied as follows. 12 Months TKV: In case of missing image for 12 Months TKV estimate, either the Ground Truth value if present (3 out of 4 cases) or the weighted average of the 10 most similar cases was used. Creatinine: the weighted average of the 10 most similar cases was used, as defined along the model predictor variables. This applied to 3 cases in baseline, 4 cases in month 12. Weight: for 3 cases, linear interpolation from most closest weight values (max 45 days) measured along the trial in the training data was applied. Imputing was applied automatically using the function kNN from R's VIM package https://cran(.)r-project(.)org(/web/)packages(/VIM/)VIM.pdf) and using the model covariates to identify the neighbors.

For model development, both in training and inference, inputs and outputs were normalized on the training data by using the values of the 10th and 90th percentile to map the corresponding unnormalized values to 0 and 1 respectively. The normalized value for each feature is thus calculated as in Equation (2):

$$x_{norm} = (I_{input} - \text{low})/(\text{high} - \text{low}), \tag{2}$$

in which:

high and low are the values of the 90th and 10th percentile.

The normalization is applied to minimize the effect of different variable scales on the prediction and to facilitate the convergence of the algorithm. During inference, the model output, annualized htTKV change at 36 months, is converted back using the inverse of (2). The normalization values for the whole dataset on the model variables are presented in Table 10. Note that during the test estimate evaluation, the normalization map was instead computed separately on the training data and applied to the test data, thus without data leakage between training and test portions.

TABLE 10

Normalization values, as percentiles of the BM training dataset.

| | Unit | 10th percentile | 90th percentile |
|---|---|---|---|
| AGE | Years | 30 | 48 |
| CREAS_BASELINE | mmol/L | 0.70 | 1.39 |
| CREAS_MONTH_12 | mmol/L | 0.72 | 1.50 |
| HTVOLUME_BASELINE | ml/m | 529.95 | 1463.45 |
| HTVOLUME_DELTA_12 | ml/m | −19.99 | 176.14 |
| HTVOLUME_DELTA_36 | ml/m | 1.13 | 121.65 |
| WTKG_BASELINE | Kg | 57.00 | 101.16 |
| WTKG_MONTH_12 | Kg | 57.88 | 102.46 |

Feature Selection

Feature selection was performed based on an exploratory model selection procedure developed in the R statistical environment, based on forward stepwise procedure for features selection applied on generalized linear models (glm). In particular, the StepAIC method of the MASS package environment was applied. Of note, TKV and eGFR are known to be associated, while overweight was recently found to be associated with higher odds of annual percent change in TKV. Further, original and logarithm versions of TKV have been alternatively used by different authors. The model selection procedure thus aimed to properly manage the potential multicollinearity among features and their interaction terms, providing the best models for goodness of fit, parsimony and interpretability of results. The following were applied to select models and features for both M1 and M2.

Due to expected potential collinearity and presence of interaction between variables, single terms were first considered in a series of univariate glm models, where each term was considered as independent variable and htTKV change at 36 months and dependent outcome variable. Modeling for M1 did not include variables measured at 12 months. The contribution of each variable was evaluated in terms of:

Significance (p-value);

Goodness of fit (adjusted-R2 and Akaike Information Criterion—AIC—). Both these indexes are adjusted for a penalized term that takes into account the number of variables included in the model. Adjusted-R2 ranges from zero to 1; for AIC, the lowest value indicates the best model.

Based on the p-value, adjusted-R2 and AIC indexes, a shortlist of candidate variables was selected to be included in a multiple glm model. Then, the forward stepwise procedure, carried out by the stepAIC function was performed to identify the best model.

Once the best model was obtained, interaction terms of the best predictors were added and evaluated through stepwise procedure and goodness of fit indexes.

In case of ties, variable configurations having the most similar structure between M1 and M2 were prioritized in order to reduce the complexity of the overall requirements of the computer system 120.

A final phase dedicated to training and evaluating the two Bayesian models was then applied. In order to mitigate the risk of selection bias, a Data Analysis Plan (DAP) extending the 10×5 repeated CV design of the FDA-led MAQC-II project was adopted. In particular, a three-layered repeated cross-validation DAP was considered. The data were split M times into training and test; for each split, a N×K repeated cross-validation was applied to the training data in the split; at each of the N repeats, candidate models were developed (trained) on the aggregation of K−1 folds and tested on the remaining data.

The use of the M×N×K schema aims to reduce the impact of selection bias before additional external datasets are tested to validate the models. Notably, the external M loop provides an unbiased estimate of performance on unseen data from the same distribution. As all splits and internal partitioning are predefined, the top candidate models can be compared over the same data. Additionally, the generation of N×K models at each of the M splits enables an empirical diagnostic analysis of stability for the candidate models, based on the comparison of the model parameters over a more numerous set of replications. In the development of the Bayesian Model a (M=20, N=10, K=5) DAP was adopted, for a total of 1000 models.

The output of the analyses based on the univariate glm models is reported in Table 11.

TABLE 11

Analysis with univariate generalized linear models.

| | pvalue | Adjusted R2 | AIC |
|---|---|---|---|
| Age | 0.142 | 0.003 | 500.36 |
| Sex | <0.001 | 0.09 | 465.21 |

TABLE 11-continued

| Analysis with univariate generalized linear models. | | | |
|---|---|---|---|
| | pvalue | Adjusted R2 | AIC |
| Creatinine_baseline | <0.001 | 0.18 | 426.35 |
| Creatinine_12month | <0.001 | 0.22 | 406.22 |
| Creatinine_delta12 | <0.001 | 0.07 | 475.13 |
| htTKV_baseline | <0.001 | 0.38 | 318.61 |
| htTKV_12months | <0.001 | 0.49 | 244.51 |
| htTKV_delta12 | <0.001 | 0.47 | 254.19 |
| corrHtVolume_Wtkg_Baseline | <0.001 | 0.14 | 441.02 |
| Weight_baseline | <0.001 | 0.16 | 436.27 |
| Weight_12months | <0.001 | 0.16 | 435.31 |

In light blue, variables in M1; light yellow: variables in M2 only. Age (at baseline visit), Sex and htTKV_baseline are included in both baseline and 12 months models.

Figure 8:
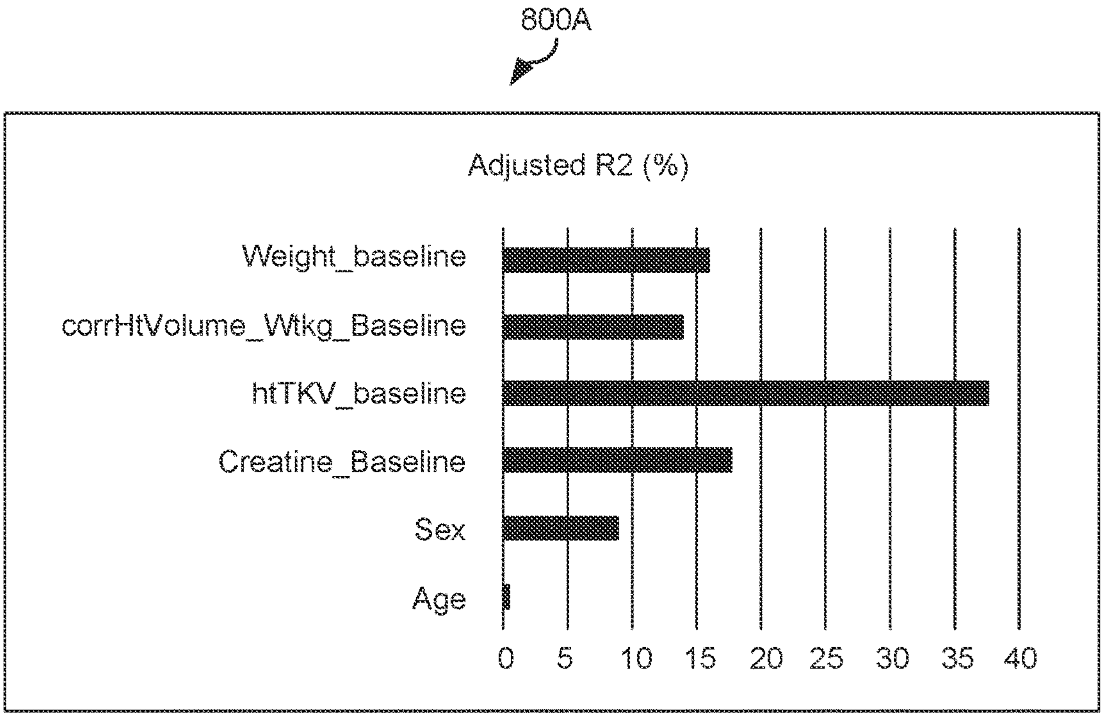
FIG. 8 illustrates examples of plot diagrams showing goodness of fit indexes at baseline.
Figure 8:
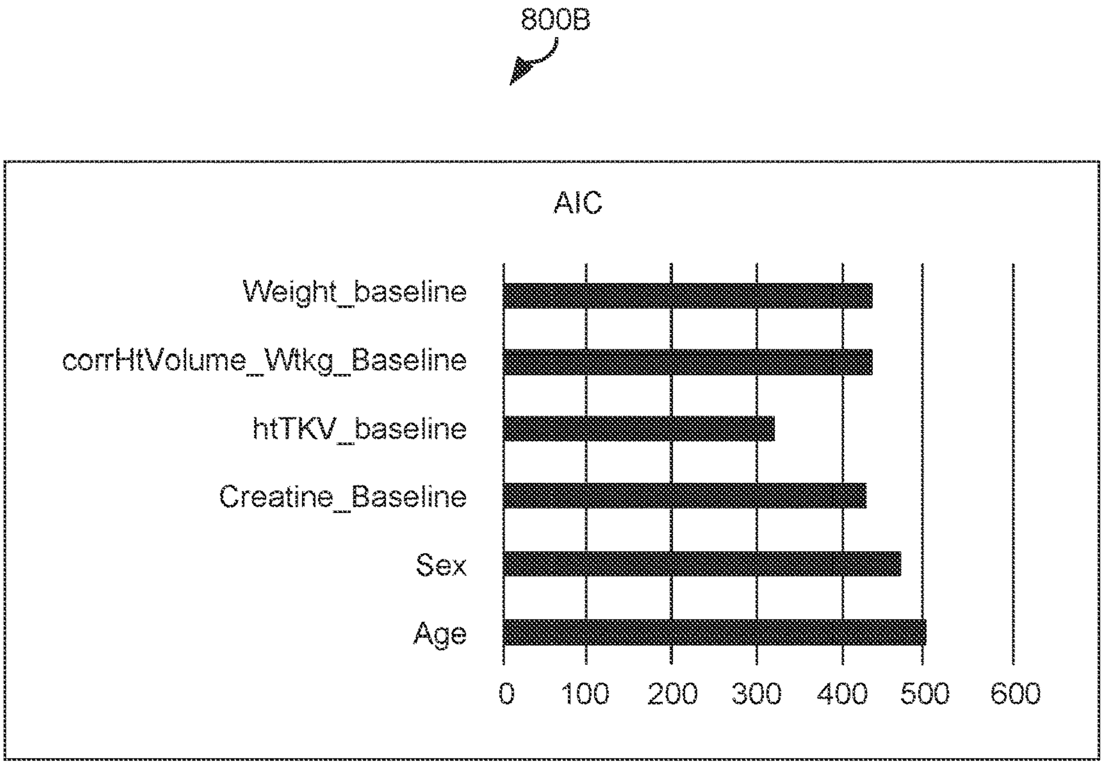

For the baseline variables, the goodness of fit indexes of the features are reported in FIG. 7. Referring to FIG. 8, plot 800A shows goodness of fit indexes of adjusted-R2 for baseline variables and plot 800B shows goodness of fix index of AIC for baseline variables. Age and Sex are included in both baseline and 12 months models. Important covariates are based on weight at baseline, estimated htVolume, Creatinine level. Other clinical variables did not reach the significance and were excluded from further analyses.

Figure 9:
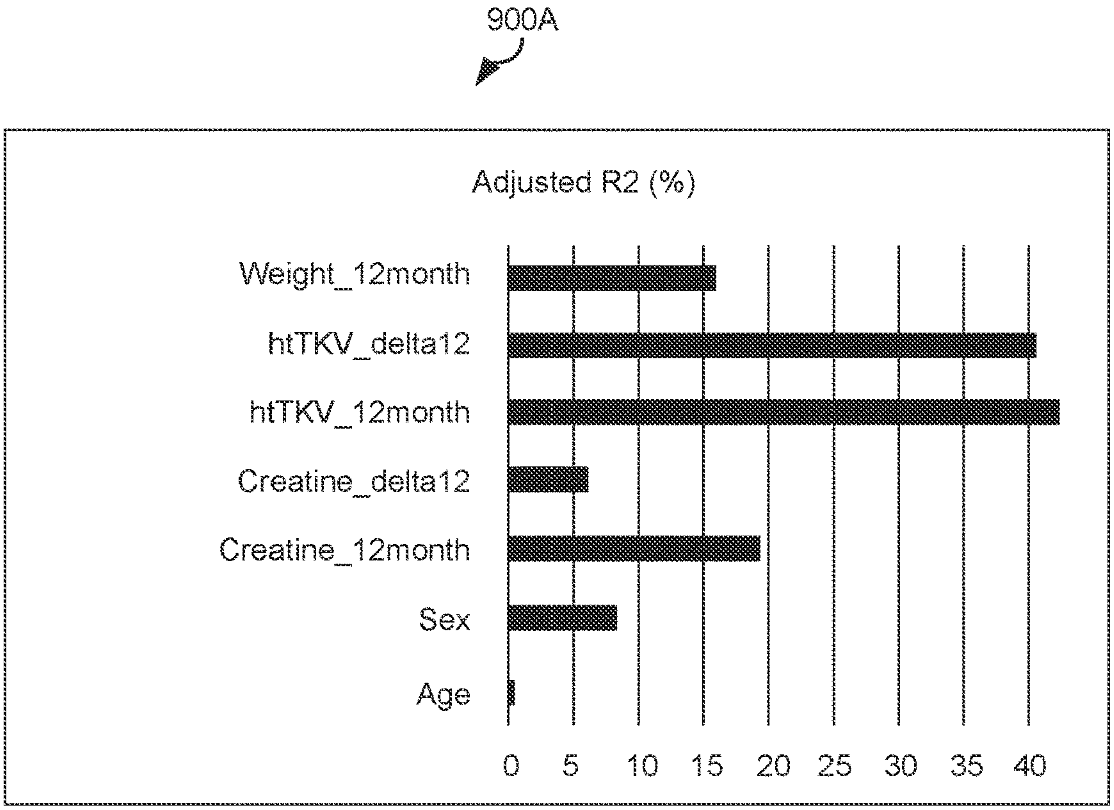
FIG. 9 illustrates examples of plot diagrams showing goodness of fit indexes at 12 months.
Figure 9:
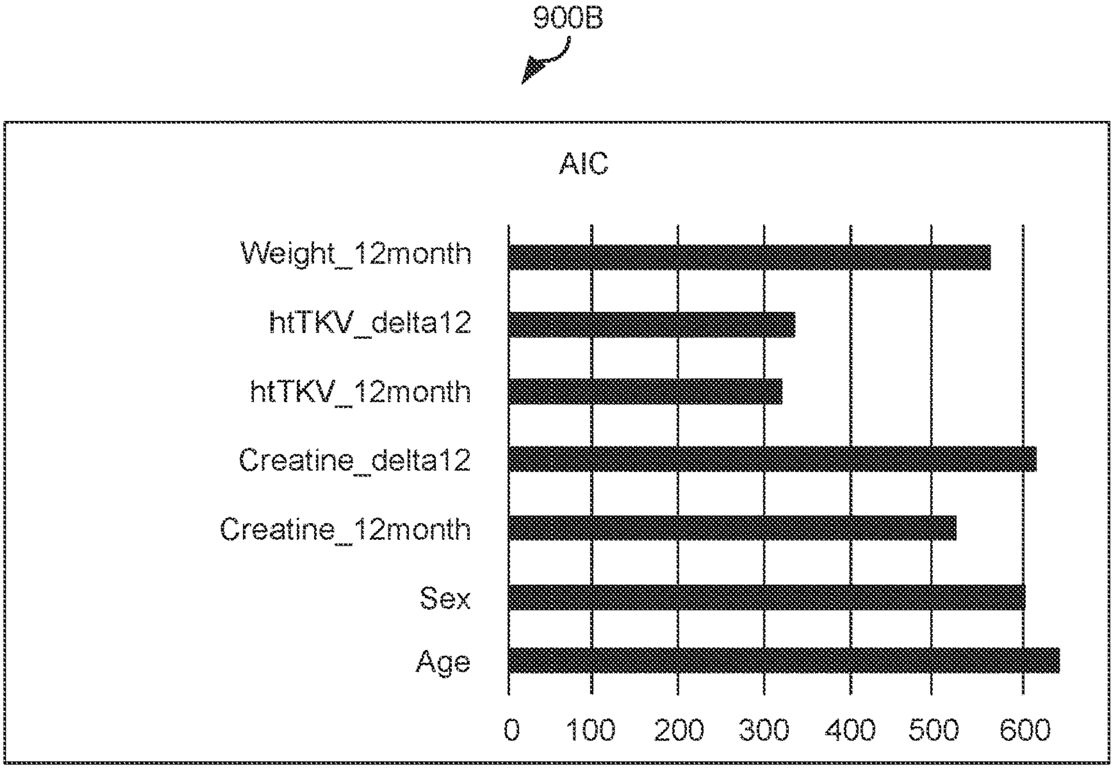

Similarly, the goodness of fit indexes for the models at 12 months are reported in FIG. 9. Referring to FIG. 9, plot 900A shows goodness of fit indexes of adjusted-R2 for variables at 12 months and plot 900B shows goodness of fix index of AIC for variables at 12 months.

For the baseline variables, the results of the forward step procedure applied on the multiple models (with all significant variables and the interaction terms) are summarized in Table 12. Although not significant, age was included as a specific adjustment for clinical application. The stepwise procedure excludes the weight at baseline: in the multiple model with all significant variables, this term is no more significant p=0.385. Moreover, by adding the interaction terms, the two goodness of fit indexes did not improve, indicating a possible redundancy of these terms in explaining the htTKV growth.

TABLE 12

| Multiple generalized linear models and stepwise procedure outputs for baseline variables. | | | |
|---|---|---|---|
| | Baseline variables | adjusted-$R^2$ | AIC |
| Multiple model with all significant variables | Age<br>Sex<br>Creatinine_baseline<br>htTKV_baseline<br>weight_corr_htTKV<br>htTKV_baseline<br>Weight_baseline | 0.48 | 302.2 |
| Variables selected by stepwise procedure | Age<br>Sex<br>Creatinine_baseline<br>htTKV_baseline<br>weight_corr_htTKV | 0.48 | 254.9 |
| Multiple models with interaction terms | age<br>sex<br>Creatinine_baseline<br>HTVol_baseline<br>weight_corr_htTKV<br>Creas*HTVOL_baseline | 0.48 | 254.7 |
| Multiple models with interaction terms | Age<br>Sex<br>Creatinine_baseline<br>HTVol_baseline<br>weight_corr_htTKV<br>Creas*HTVOL_corr | 0.48 | 256.0 |

Similarly, the results of the features selection steps for the variables at 12 months are reported in Table 13. The stepwise procedure excludes the weight, Creatinine and htTKV at 12 months. As for the baseline case, the interaction terms do not add any contribution in explaining the htTKV change at 36 months: the models without the interaction terms have adjusted-R2 and AIC equal or better than the corresponding values for the more complex model with interactions.

TABLE 13

| Multiple generalized linear models and stepwise procedure outputs for variables at 12 months. | | | |
|---|---|---|---|
| | Baseline variables | adjusted-R2 | AIC |
| multiple model with all significant variables | Age<br>Sex<br>Creatinine_12month<br>Creatinine_delta12<br>htTKV_baseline<br>htTKV_12months<br>htTKV_delta12<br>weight_corr_htTKV<br>Weight_12months | 0.66 | 88.9 |
| variables selected by stepwise procedure | Age<br>Sex<br>Creatinine_delta12<br>htTKV_baseline<br>weight_corr_htTKV<br>htTKV_delta12 | 0.67 | 80.9 |
| multiple models with interaction terms | Age<br>Sex<br>Creatinine_delta12<br>htTKV_baseline<br>weight_corr_htTKV<br>htTKV_delta12<br>Creas_delta12*HTVOL_baseline | 0.67 | 80.7 |
| multiple models with interaction terms | Age<br>Sex | 0.67 | 80.8 |

TABLE 13-continued

Multiple generalized linear models and stepwise procedure outputs for variables at 12 months.

| | Baseline variables | adjusted-R2 | AIC |
|---|---|---|---|
| multiple models with interaction terms | Creatinine_delta12<br>htTKV_baseline<br>weight_corr_htTKV<br>htTKV_delta12<br>Creas_delta12*weight_corr_htTKV<br>Age<br>Sex<br>Creatinine_delta12<br>htTKV_baseline<br>weight_corr_htTKV<br>htTKV_delta12<br>Creas_delta12*whtTKV_delta12 | 0.67 | 82.4 |

Figure 10A:
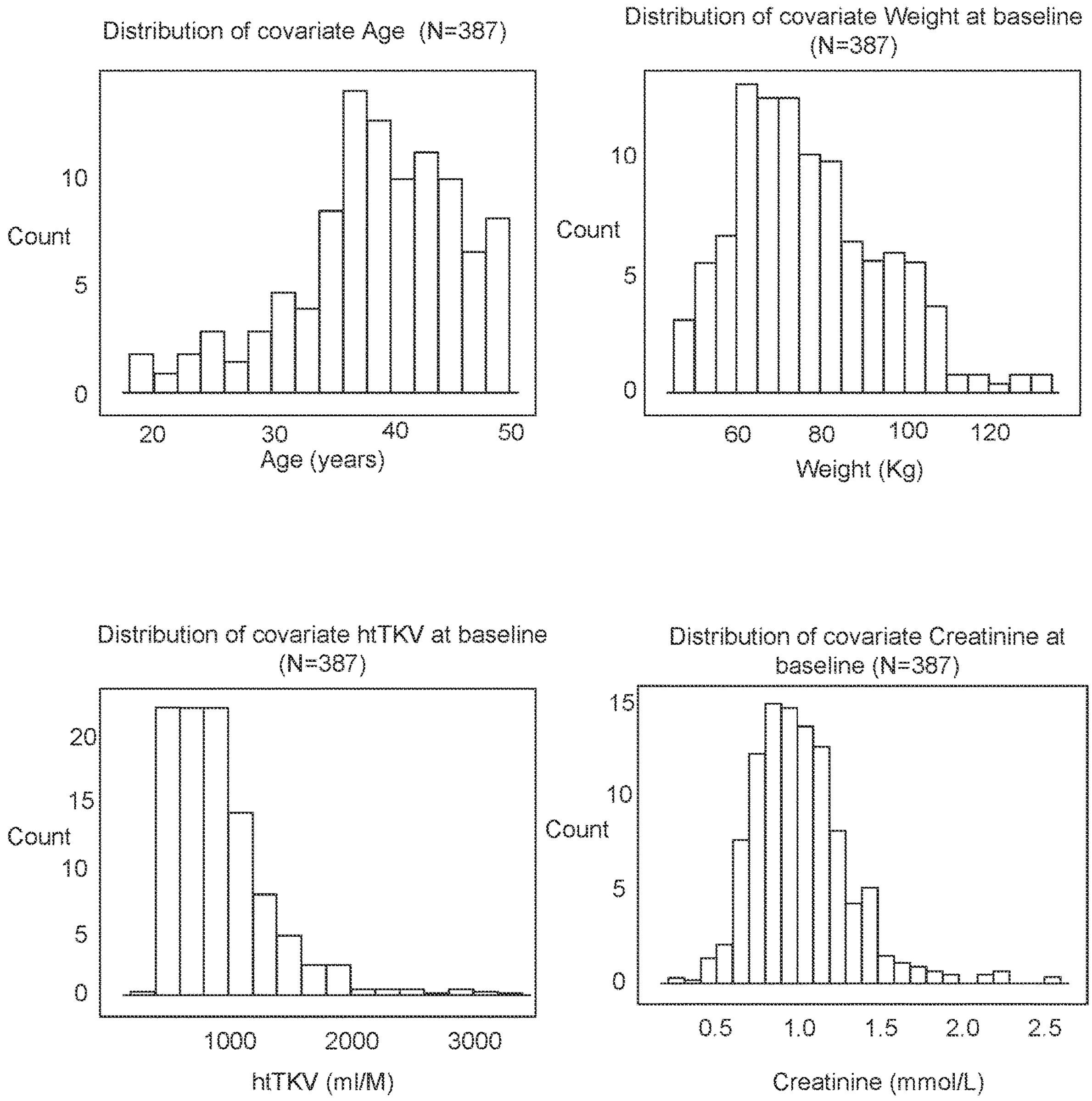
FIGS. 10A and 10B show plots of the clinical and demographic covariates distributions.
Figure 10B:
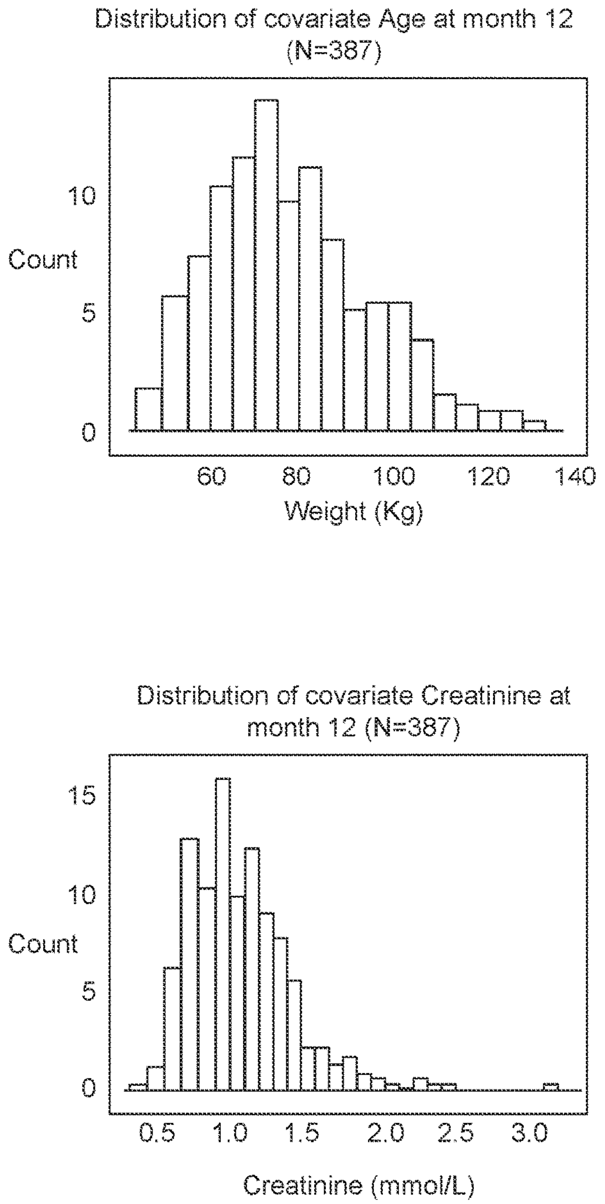
Figure 11:
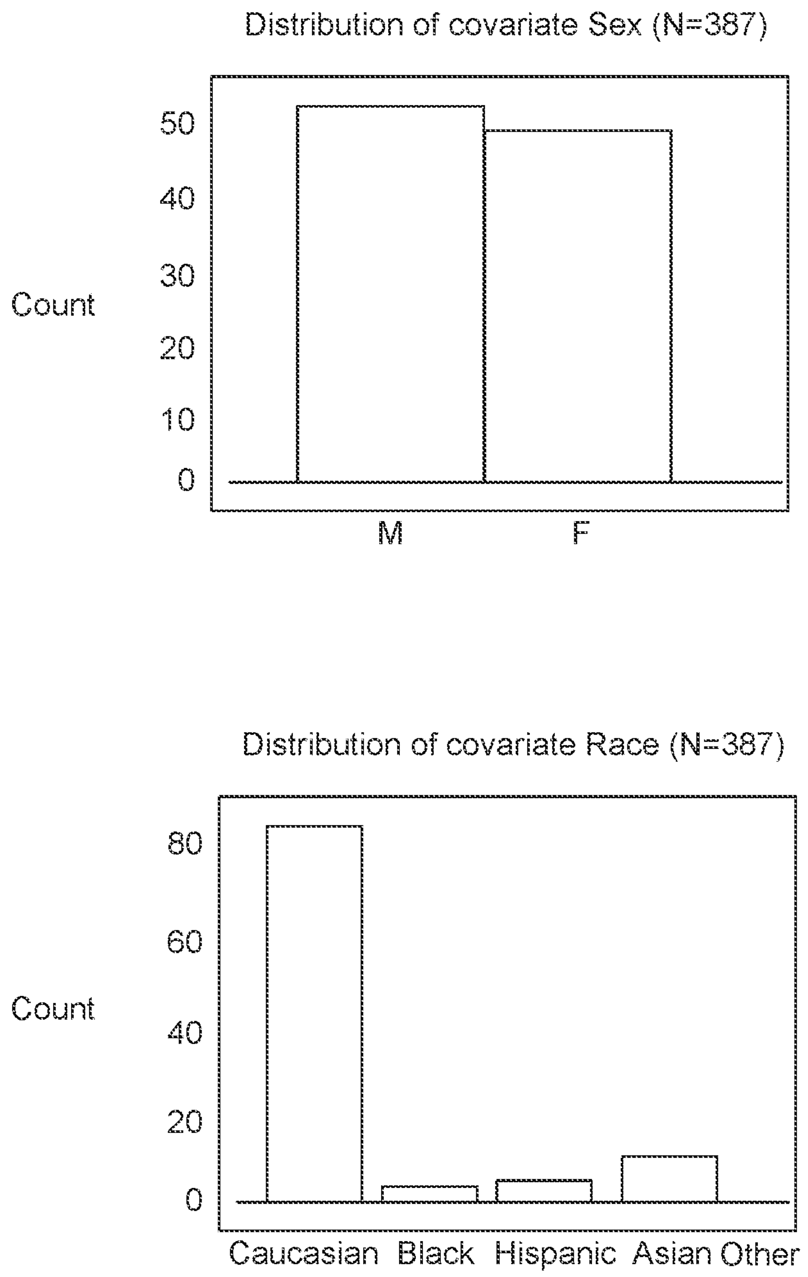
FIG. 11 shows plots of sex and race distributions in the training data used in developing the growth prediction models.

FIGS. 10A and 10B show plots of the clinical and demographic covariates distributions. FIG. 11 shows plots of sex and race distributions in the training data used in developing the growth and risk prediction models 144A-N, such as M1 and M2. Race is not considered as input to the regression model given its strong imbalance in the dataset. Furthermore, inclusion of the race as predictor of prognosis is strongly discouraged in recent literature on Chronic Kidney Disease.

Figure 12:
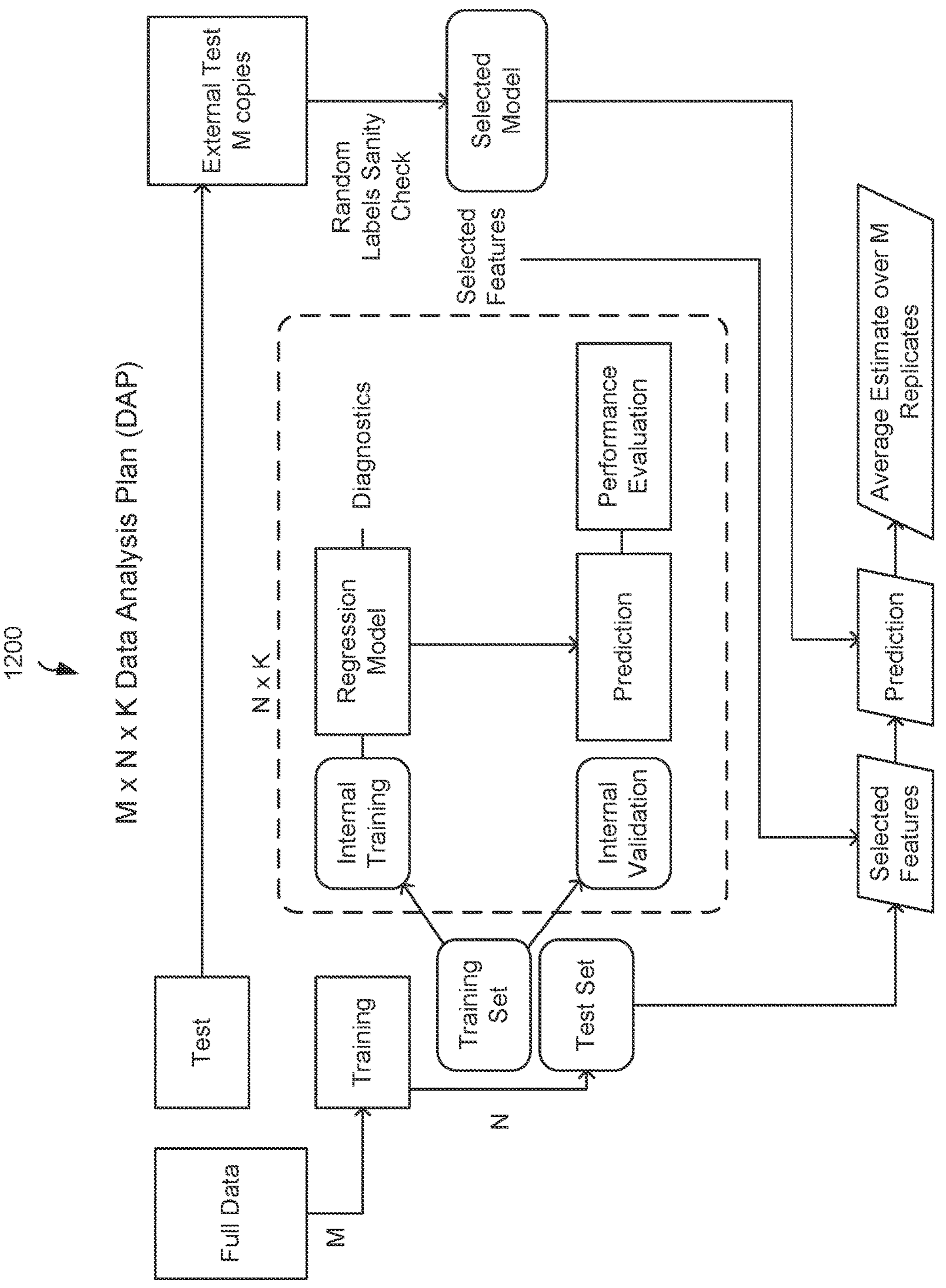
FIG. 12 illustrates an example of an architecture of unbiased selection and validation for the growth prediction model.

FIG. 12 illustrates an example of an architecture 1200 of unbiased selection and validation of a growth and risk prediction model 144. The plan is based on the extended MAQC Data Analysis Plan. In classification tasks, a random label experiment can be applied to identify possible data leakage effects.

For model candidates, the regression model was based on two main phases: training and test. Notably, the models have been developed and evaluated by adopting an expanded version of the repeated 10×5 cross-validation (CV) schema adopted from the FDA's led Microarray Analysis and Quality Control (MAQC) Consortium for the evaluation of variability of predictive biomarkers. The original Data Analysis Plan (DAP) of the MAQC consortium has been extended to a M×N×K structure composed of:

M random splits of data in Training and Test.

N iterated reshufflings over Training.

Training on K-fold cross validation (thus: splitting the data in K portions (folds), training on the union of K−1 folds and testing internally on the remaining 1/K fraction, then rotating).

The N iterations of the K-fold cross-validations enable a model selection (identification of candidate models by validation on data unseen in training) mitigating the risk selection bias. Indeed the estimates on the internal test sets are completely disjoint from the left out test set portion. This schema was previously proposed for training of predictive models on gene expression microarray data. For all splits, the partitioning of data also considered stratification on relevant covariates, in order to ensure a balanced amount of training data of similar characteristics in all splits. The extension used in this study also incorporates routines for collecting diagnostic quantities from the training of the Bayesian linear models that can be used for empirical confirmation of parameter estimates.

Several metrics were applied on the internal (N×K) section and external (M level) one, focusing on accuracy of the point estimate, variability and stability of the predictions, and the accuracy in estimating the likelihood of TKV >5% growth rate (semi-qualitative estimate of likelihood). The performance of the deployed model is thus evaluated at three levels: for the available training data: (i) as averages on N internal test sets, (ii) as average on M unseen test datasets completely isolated from the data used in internal training and validation and for independent test data: (iii) Isolated from training and validation dataset in the clinical validation.

The M×N×K cross-validation schema, in particular within the N×K section, also enabled to identify potential outliers in the dataset and drive model optimization. The N iterations of the K-fold cross-validations enable a model selection (identification of candidate models by validation on data unseen in training) mitigating the risk selection bias. Indeed the estimates on the internal test sets are completely disjoint from the left out test set portion. This schema was previously proposed for training of predictive models on gene expression microarray data. In this study, for all splits, the partitioning of data also considered stratification on relevant covariates, in order to ensure a balanced amount of training data of similar characteristics in all splits. The extension used in this study also incorporates routines for collecting diagnostic quantities from the training of the Bayesian linear models that can be used for empirical confirmation of parameter estimates.

Accuracy

The MAE estimates for models M1 and M2 are reported in Table 14; this comprises the estimated MAE from the internal N×K part of the DAP and from the external M one. The table includes 95% studentized bootstrap confidence intervals for means (tbCIs) for internal and external, test and training phases. In particular, the estimates are reported for:

IntTrain Mean: internal training MAE averaged on N×K replicates;

IntTest Mean: internal test MAE averaged on N×K replicates;

Low/Up: 95% studentized bootstrap confidence interval for means of internal tests (tbCI).

M300: MAE on n=300 training data averaged over the M replicates;

Mtest Mean: average of MAE over n=87 test data, over replicates;

MTest Low/Up and M300 Low/up: tbCI estimates

The estimated MAEs on external test are: for M1: Mtest_Mean=28.85 (CI: 27.58-30.19), for M2: Mtest_Mean=22.79 (CI: 21.82-23.60). The MAE estimates on the external test are consistent with those from aggregation over the internal tests, which is an indication of fair control over selection bias in the procedure. A substantial improvement in external test prediction (−21.0% MAE) is obtained with the use of data from both visits (baseline and at month 12).

TABLE 14

Results for the M1 and M2 Bayesian models.

| name | M1 | M2 |
|---|---|---|
| intTest Mean | 28.95 | 23.31 |
| intTest Low | 28.07 | 22.59 |
| intTest Up | 29.85 | 24.06 |
| intTrai nMean | 28.39 | 22.7 |
| intTrai nLow | 28.16 | 22.51 |
| intTrai nUp | 28.61 | 22.89 |
| MTest Mean | 28.85 | 22.79 |
| MTest Low | 27.58 | 21.82 |
| Mtest Up | 30.19 | 23.6 |
| M300 Mean | 28.43 | 22.75 |
| M300 Low | 28.07 | 22.52 |
| M300 Up | 28.77 | 23.02 |

DAP (M × N × K), with M = 20, N = 10, K = 5. IntTrain Mean: internal training MAE averaged on N × K replicates; IntTest Mean: internal test MAE averaged on N × K replicates; Low/Up: 95% studentized bootstrap confidence interval for means of internal tests (tbCI). M300: MAE on n = 300 training data averaged over the M replicates; Mtest Mean: average of MAE over n = 87 test data, over replicates; MTest Low/Up and M300 Low/up: tbCI estimates.

The model coefficients and their estimated posterior distributions are reported in Tables 14 and 15 for M1 and M2, respectively.

TABLE 14

Coefficients for the estimated posterior distributions of the M1 Bayesian model input covariates.

| Model M1 - Coefficients | Estimate | Est. Error | Q2.5 | Q97.5 |
|---|---|---|---|---|
| Intercept | 0.25 | 0.03 | 0.19 | 0.31 |
| sigma_Intercept | −1.70 | 0.05 | −1.81 | −1.59 |
| HTVOLUME_BASELINE_predicted | 0.98 | 0.04 | 0.90 | 1.07 |
| AGE | −0.08 | 0.03 | −0.14 | −0.02 |
| corr_HTVOLp_WTKG_BASELINE | −0.40 | 0.06 | −0.51 | −0.28 |
| SEX (2 = Female) | −0.07 | 0.03 | −0.13 | −0.01 |
| CREAS_BASELINE | 0.06 | 0.04 | −0.03 | 0.14 |
| sigma_HTVOLUME_BASELINE_predicted | 0.94 | 0.09 | 0.77 | 1.13 |

TABLE 15

Coefficients for the estimated posterior distributions of the M2 Bayesian model input covariates

| Model M2 - Coefficients | Estimate | Est. Error | Q2.5 | Q97.5 |
|---|---|---|---|---|
| Intercept | 0.10 | 0.02 | 0.05 | 0.15 |
| sigma_Intercept | −1.88 | 0.05 | −1.99 | −1.78 |
| HTVOLUME_DELTA_12_predicted | 0.46 | 0.03 | 0.40 | 0.52 |
| HTVOLUME_BASELINE_predicted | 0.74 | 0.05 | 0.64 | 0.83 |
| AGE | −0.05 | 0.03 | −0.10 | 0.00 |

Figure 13A:
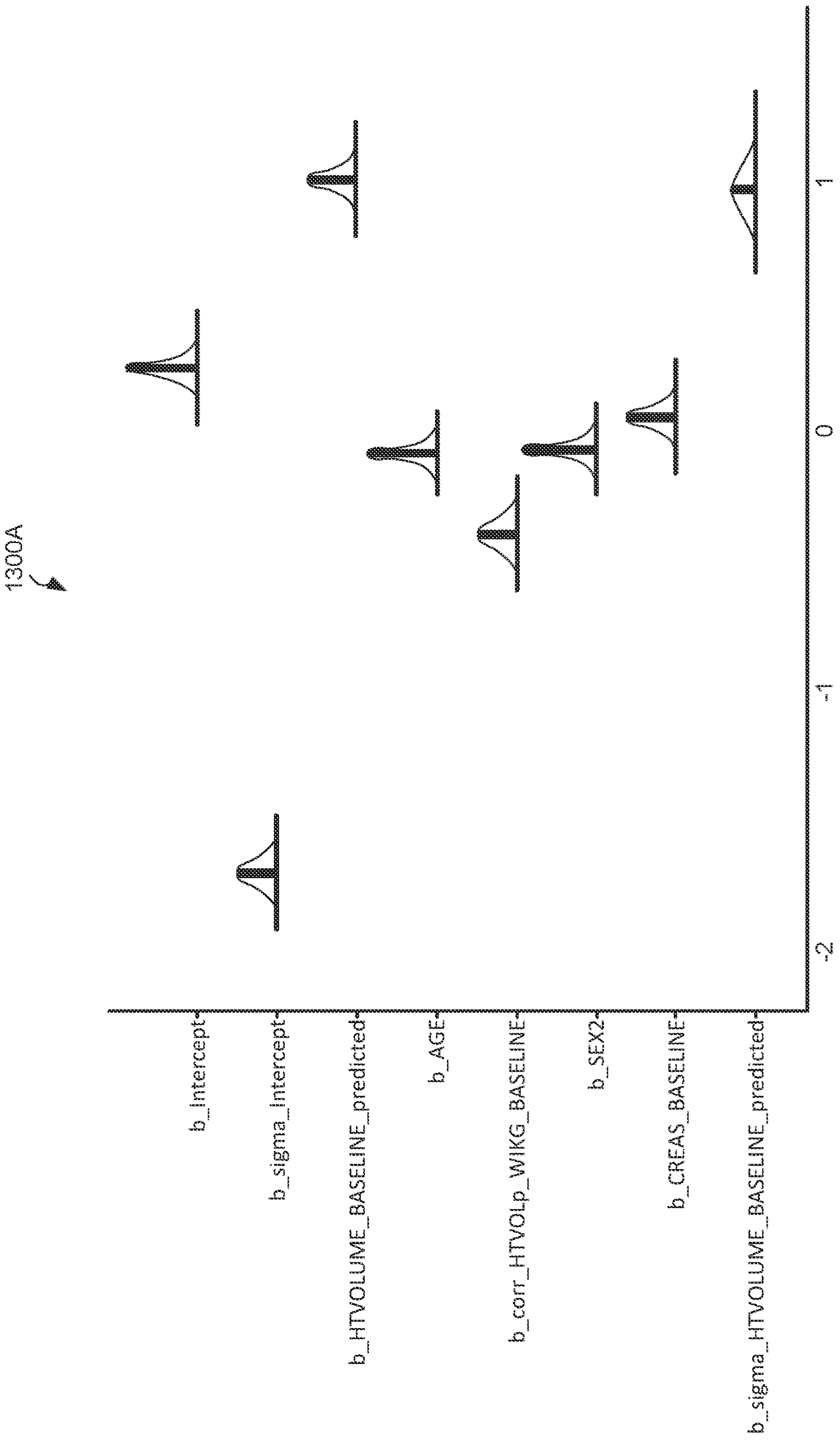
FIGS. 13A and 13B show examples of estimated posterior distributions of coefficients of the growth and risk prediction models M1 and M2.
Figure 13B:
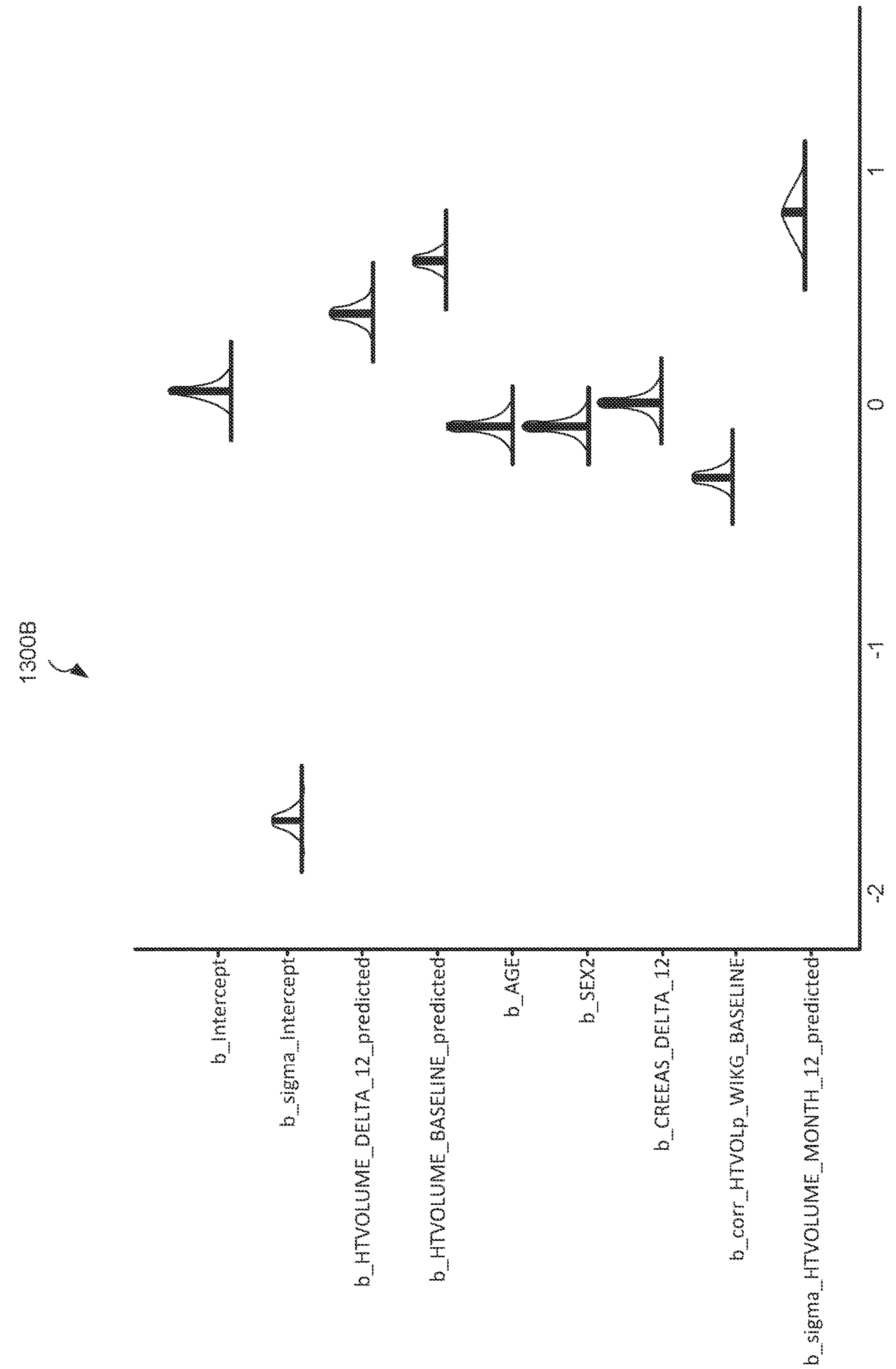

Estimates were computed by blmr. A graphical representation for the model coefficients, also confirmed by an extensive empirical analysis collecting the coefficients from the M×N×K models from the DAP, are illustrated in FIGS. 13A and 13B.

Estimates were computed by blmr. A graphical representation for the model coefficients, also confirmed by an extensive empirical analysis collecting the coefficients from the M×N×K models from the DAP, are illustrated in FIGS. 13A and 13B.

Estimates were computed by blmr. A graphical representation for the model coefficients, also confirmed by an extensive empirical analysis collecting the coefficients from the M×N×K models from the DAP, are illustrated in FIGS. 13A and 13B.

Figure 14:
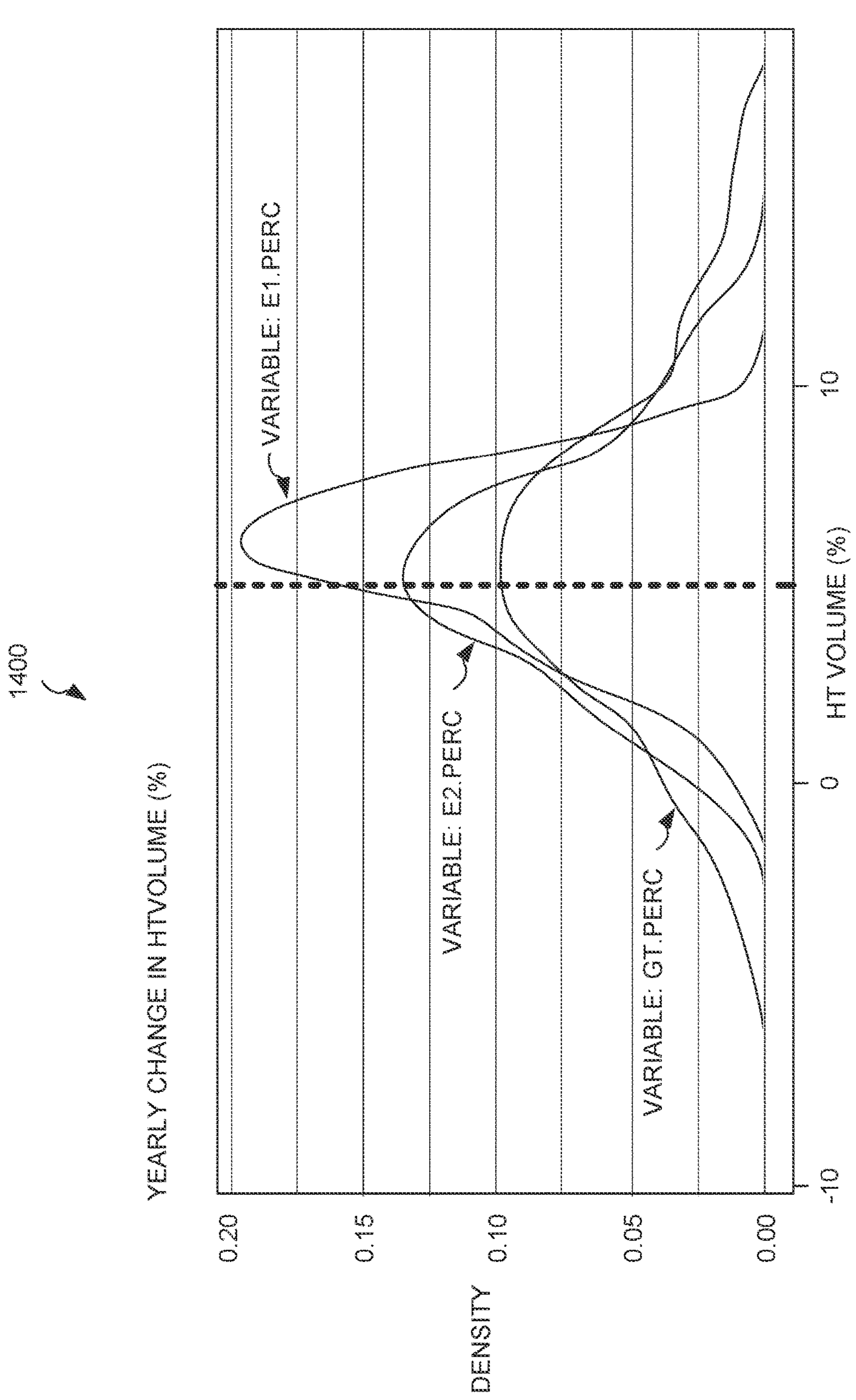
FIG. 14 shows an example plot of a distribution of scaled yearly percent growth of Height Normalized Volume (HTVolume) with respect to value at first visit.

FIG. 14 shows an example plot 1400 of a distribution of scaled yearly percent growth of HTVolume with respect to value at first visit. The distributions of values estimated by model M1 (E1: gray) and M2 (E2: yellow) are compared with ground truth (GT: green). Data for untreated subjects in the training data. The red line indicates the 5% threshold. The Bayesian models, in particular the M2 (two MRIs), fit well the central section of the Training data distribution. Model M2 manages to cover tails better than M1. The direct use of TKV estimates as a binary classifier in comparison for the 5% fast progression threshold leads to an average 65% accuracy for M1 and 74.5% for M2, as shown in Table 14. Notably, the distribution of the Training data is centered around the 5% fast progression threshold, thus indicating the use of an additional step to estimate risk of fast progression, as documented in the next section.

TABLE 14

Confusion matrix from direct application of the regression models M1 and M2 to the TKV progression estimate.

| | M1 ≤ 5% | M1 > 5% | M2 ≤ 5% | M2 > 5% |
|---|---|---|---|---|
| GT Slow (≤5%) | 22.2 | 22.2 | 31.3% | 13.2% |
| GT Fast (>5%) | 10.6 | 45.0 | 12.4% | 43.2% |

GT: ground truth data.

Definition of the Risk Score

Figure 15A:
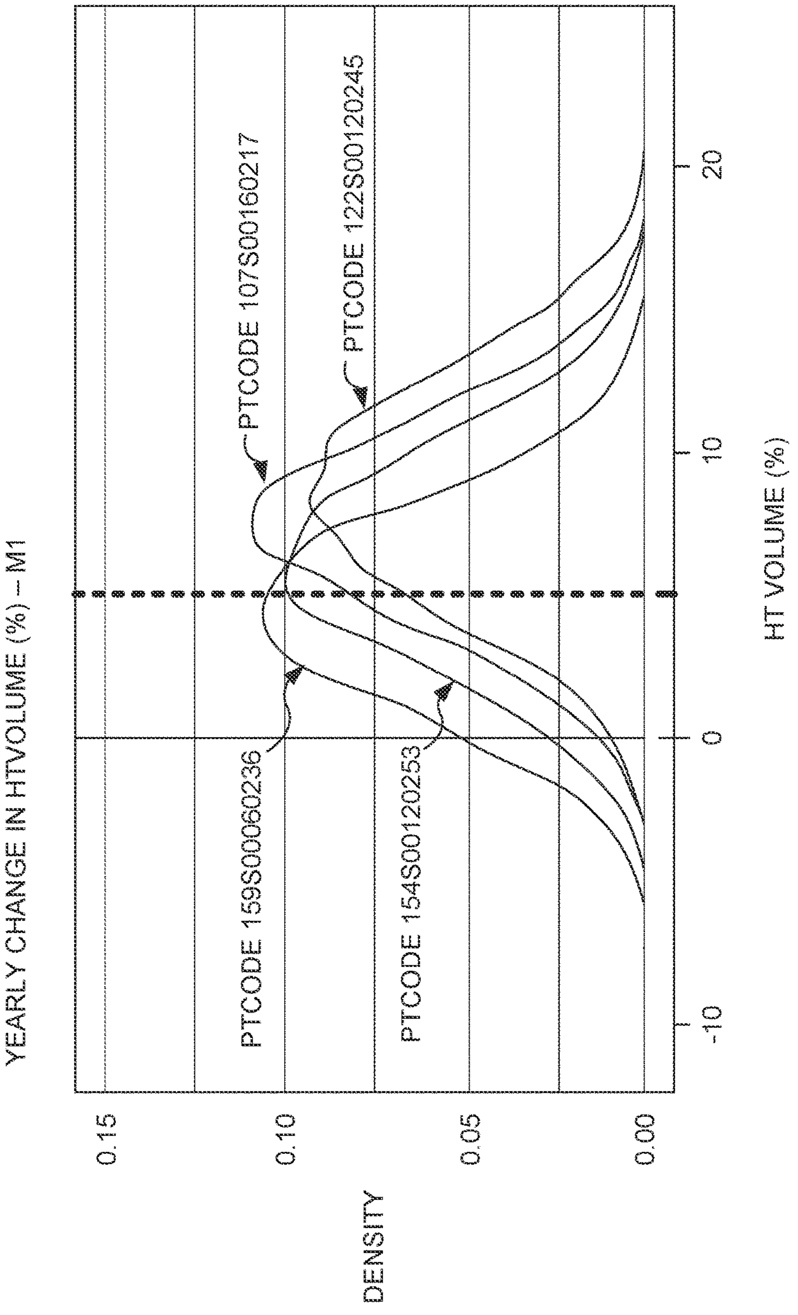
FIGS. 15A and 15B show examples of an analysis of posterior probabilities by the models M1 and M2 on four prototype subjects.
Figure 15B:
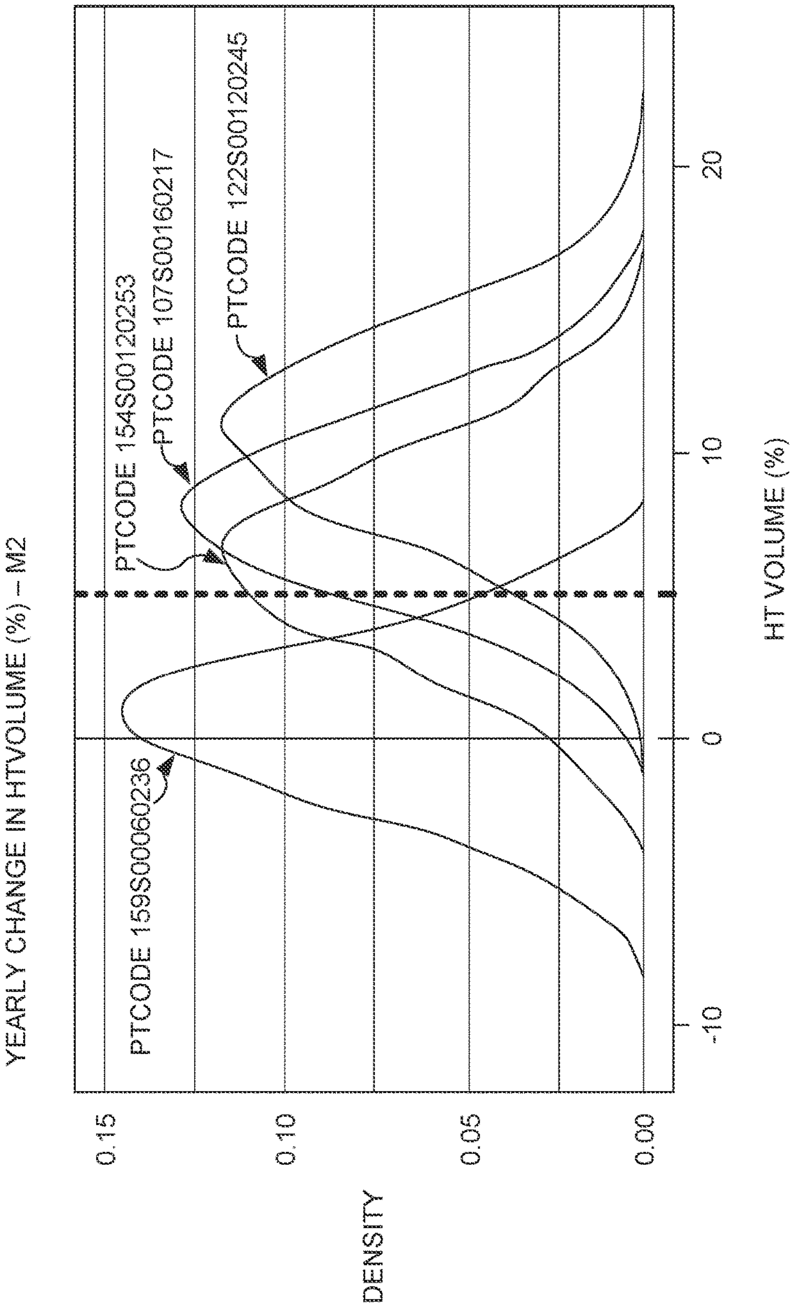

The Bayesian regression models M1 and M2 provide, for each new input vector, an estimate of the response variable (yearly change of htVolume) as well as of its posterior probability. Such posterior probability is often used to estimate the uncertainty of the prediction by computing the two-sided 95% credible intervals (l-95% CI and u-95% CI) based on quantiles. In order to estimate the likelihood of TKV >5% growth rate, in the computer system 120 the posterior probability is compared with the 5% fast progression threshold. The ht Volume posterior probability based on the M1 or M2 model is estimated and, given the area under the curve defining the posterior probability. The fraction of area right of the 5% decision threshold (Area.Right) is considered as a risk score function of the probability of correctly choosing the subject. A subject is allocated to one of two classes "High" (Fast progressor) or "Unable to Determine" (Other) if Area.Right >T, where T is an appropriate threshold (0<T<1) calibrated to optimize the primary outcomes of the study. As an example, the right area scores (Area.Right) for the four prototype subjects listed in Table 15 are used to classify ADPKD subjects in the two risk progression classes, for T=80%; also shown in FIGS. 15A and 15B.

TABLE 15

Example of area computation for four subjects.

| Subject code | Area.Right M1 (%) | Area.Right M2 (%) | GT.perc (%) | Risk of Fast progression |
|---|---|---|---|---|
| 107S00160217 | 75.30 | 87.92 | 6.38 | High |
| 159S00060236 | 44.96 | 11.40 | 2.87 | Unable to Determine |
| 122S00120245 | 81.08 | 95.52 | 10.85 | High |
| 154S00120253 | 63.12 | 71.38 | 4.64 | Unable to Determine |

APKD cases in the training data. Red line: 5% threshold for annualized htVol increase, normalized on value at first visit.

The ROC analysis for the two risk score functions AR1 (Area.Right.M1) and AR2 (Area.Right.M2) as predictors for GT.Perc >5% identifies a superiority of model M2, with AUC(M2)=0.827 over M1 with AUC(M1)=0.712.

The difference between the two ROC curves is statistically significant (DeLong test pvalue: p=7.112e−07). The ROC curves are compared in FIG. 13.

Figure 16:
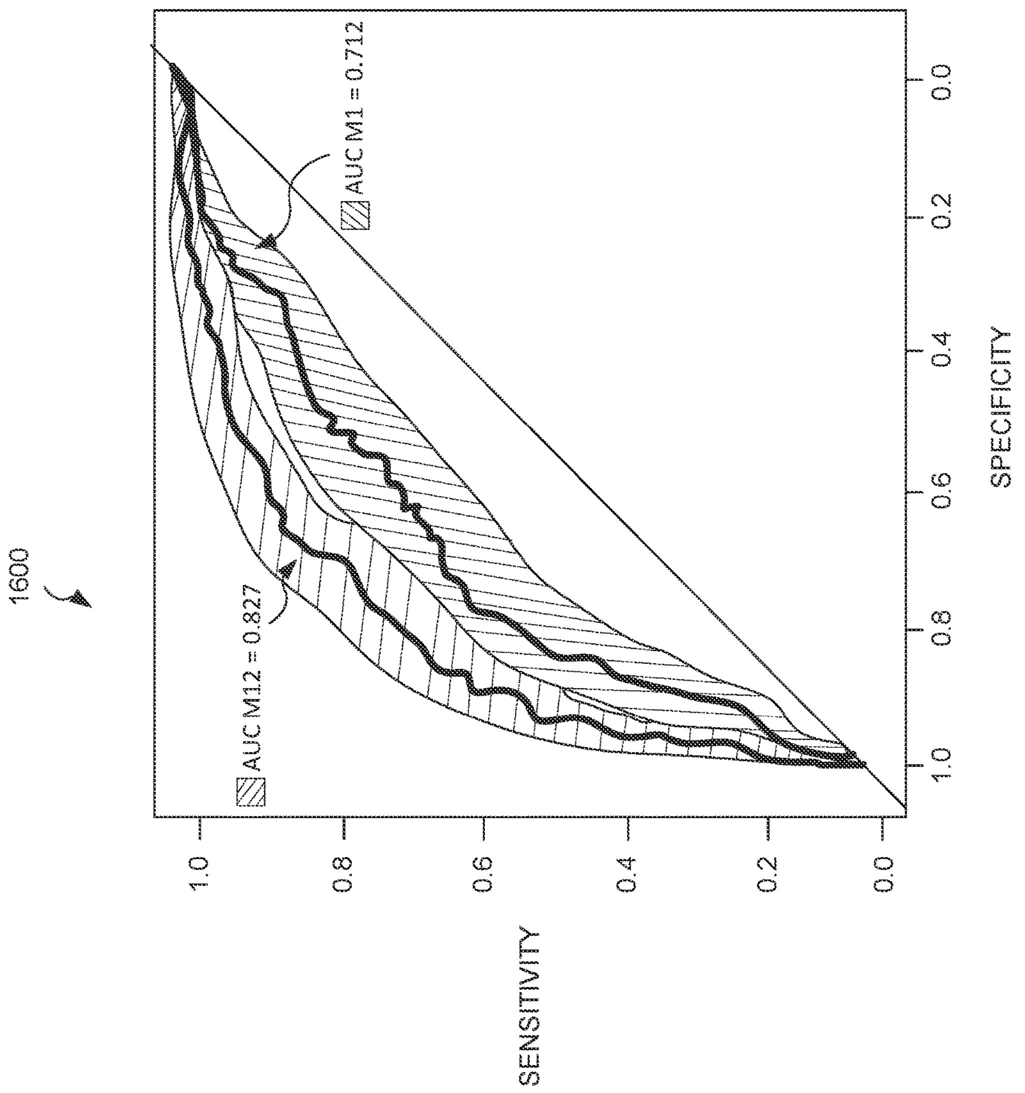
FIG. 16 illustrates an example of a plot of ROC analysis for the area right method, compared to the ground truth classification.

FIG. 16 illustrates an example of a plot 1600 of ROC analysis for the area right method, compared to the ground truth classification. ROC analysis for the area right method, compared to the ground truth classification (GT.perc >5%). Bootstrap CI (n=100 replicates). ROC analysis: comparison of AUC for the area.right functions between the M1 and M2 models AUC M1=0.712 (M1: gray curve) AUC M12=0.827 (M2: cyan curve) DeLong test pvalue: p<0.001

For the Youden index, i.e. cutoff with max(specificity+sensitivity), the suggested optimal combinations (computed by the pROC package) are reported in Table 16.

TABLE 16

Youden Index analysis for M1 and M2.

| | threshold | Spec | Sens | Spec + Sens |
|---|---|---|---|---|
| M1 | 0.53 | 0.58 | 0.78 | 1.36 |
| M2 | 0.61 | 0.84 | 0.67 | 1.51 |

For ad hoc cutoff choices, the values of specificity, sensitivity, PPV and NPV are also reported in Table 17.

TABLE 17

Classification metrics for the M1 and M2 models (training data − placebo)

| Model/Threshold | Sens | Spec | PPV | NPV |
|---|---|---|---|---|
| M1/73 | 0.29 | 0.92 | 0.83 | 0.51 |
| M2/73 | 0.49 | 0.93 | 0.90 | 0.59 |
| M1/80 | 0.13 | 0.98 | 0.90 | 0.47 |
| M2/80 | 0.35 | 0.95 | 0.91 | 0.55 |

Comparison to Mayo APKD risk classification.

A comparison of the likelihood of annualized TKV >5% growth rate risk classes of the—BM Model with the Mayo classes is provided in Table 18 and FIG. 16. A higher percentage of rapid progressors are captured in class High by both models M1 (90%) and M2 (91%) than in any classes of the Mayo classification system, in particular for the High risk class defined by the aggregation of the 1D-1E classes.

TABLE 18

Comparison of the Mayo model (I) and the computer system 120 (II) on the Placebo data in the training data.

| | I. Mayo Model | | | | | | | |
|---|---|---|---|---|---|---|---|---|
| | 1A | 1B | 1C | 1D | 1E | 1A-1C | 1D-E | 1C-D-E |
| n | — | 29 | 167 | 131 | 60 | 196 | 191 | 358 |
| n in Fast Progression (%) | — | 9 (31%) | 87 (52%) | 80 (61%) | 39 (65%) | 96 (49%) | 119 (62%) | 206 (58%) |

| II. BM | M1- 0.73 | M1- 0.80 | M2- 0.73 | M2- 0.80 |
|---|---|---|---|---|
| n | 76 | 30 | 117 | 86 |
| n in Fast Progression (%) | 63 (83%) | 27 (90%) | 105 (90%) | 78 (91%) |

Figure 17:
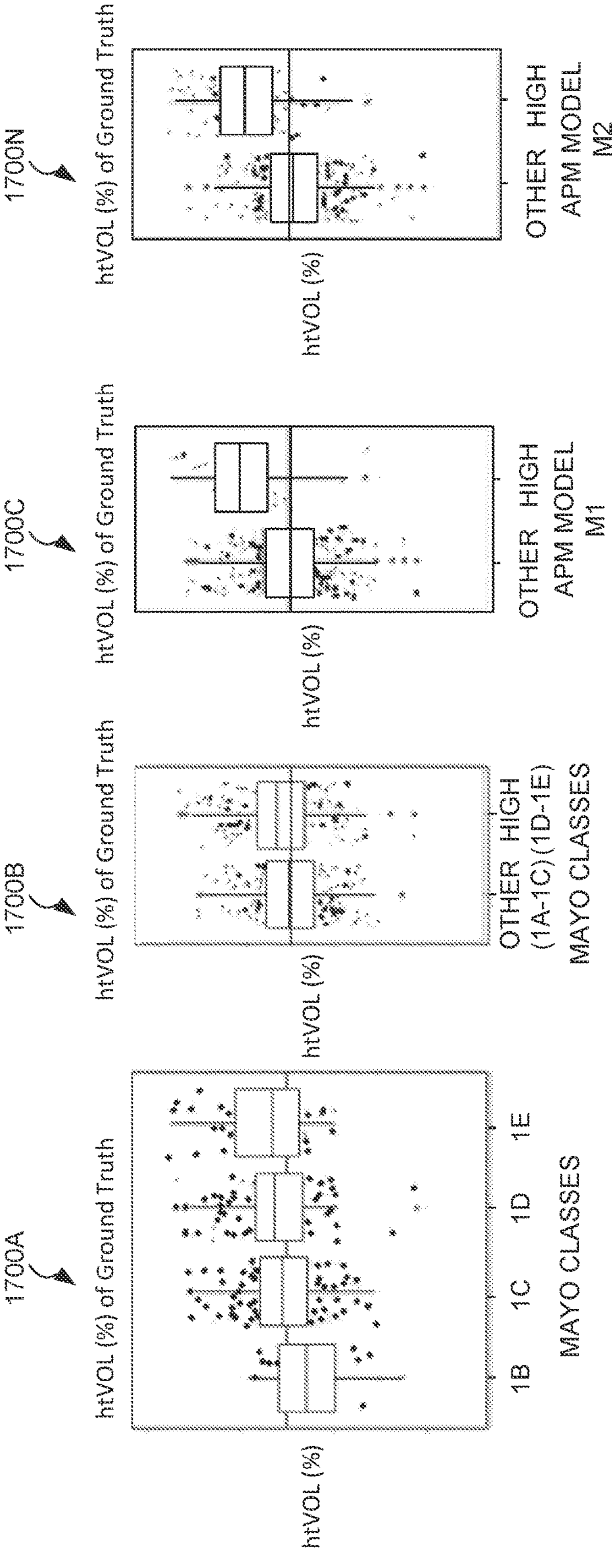
FIG. 17 illustrates examples of plots of ground truth (% annualized TKV change)

FIG. 17 illustrates examples of plots of ground truth (% annualized TKV change). Plot 1700A is an example of ground truth for Mayo Classification, plot 1700B is an example of ground truth for Binary classification Mayo 1A-1C vs ID-1E, plot 1700C is an example of ground truth for Model M1, and plot 1700D is an example of ground truth for Model M2. The models M1 and M2 compare favorably with the Mayo Classification, also with the 1A-1C vs 1D-1E binarization. 1600A APDKD Mayo Classification 1600B Mayo: 1A-1C vs 1D-1E 1600C APM Model M1 1600D Model M2

Outputs for BM

The system provides a risk score in 2 levels for the likelihood of TKV >5% growth rate ("High" vs "Unable to determine"), that is ultimately shown to the user in the web interface. In addition, point estimates and the reliability of prediction are computed, based on probability distribution for annualized TKV % change over three years utilizing a Bayesian regression model and in terms of an 80% and 95% CI around the predicted annualized TKV % change over three years. The interval accounts for measurement error of the clinical variables used for model building. Together with the CI, the model returns a series of points sampled from the posterior for plotting needs and a boolean indicating the reliability of the measure (TRUE if the width of the 95% CI are narrower than 20% of the baseline TKV). These additional values are not shown to the user but are generated for quality control purposes and can be accessed only by authorized users through a separated admin endpoint.

For example, a form of the first-order differential equation, $dy/dt=F(y, x)$ where y is a scalar TKV and x is a vector of subject clinical measurements may be assumed. Or its transformed but still first-order equation can be assumed. Or its stochastic version differential equation could be considered. The underlying differential equation can be also learned by a machine learning approach.

Clinical Support Systems Based on the Predicted Future Size

The clinical support subsystem 150 may generate and provide interfaces 153 for display at a client system 170. The interfaces 152 may facilitate clinical support to clinicians such as health care professionals. Through the interfaces 152, clinicians may view size estimates 131, future sizes 141, risk probabilities 151, and/or other data accessed or generated by the computer system 120. As such, the clinical support subsystem 150 may be accessed by clinicians to manage subject care, including accessing risk classes for the subject and care plans based on the risk classes. For example, the clinical support subsystem 150 may also generate treatment assessments based on the risk probabilities 151. Thus, if a subject is part of a binary class that represents a likelihood that a growth rate in the size of the target object (such as a kidney) exceeds a threshold growth rate (such as 5% annually), then the clinical support subsystem 150 may determine that the subject should be treated with Tolvaptan, advised to avoid potential injury to the kidneys by limiting contact sports or other activities, and/or provided with other treatments.

Figure 18:
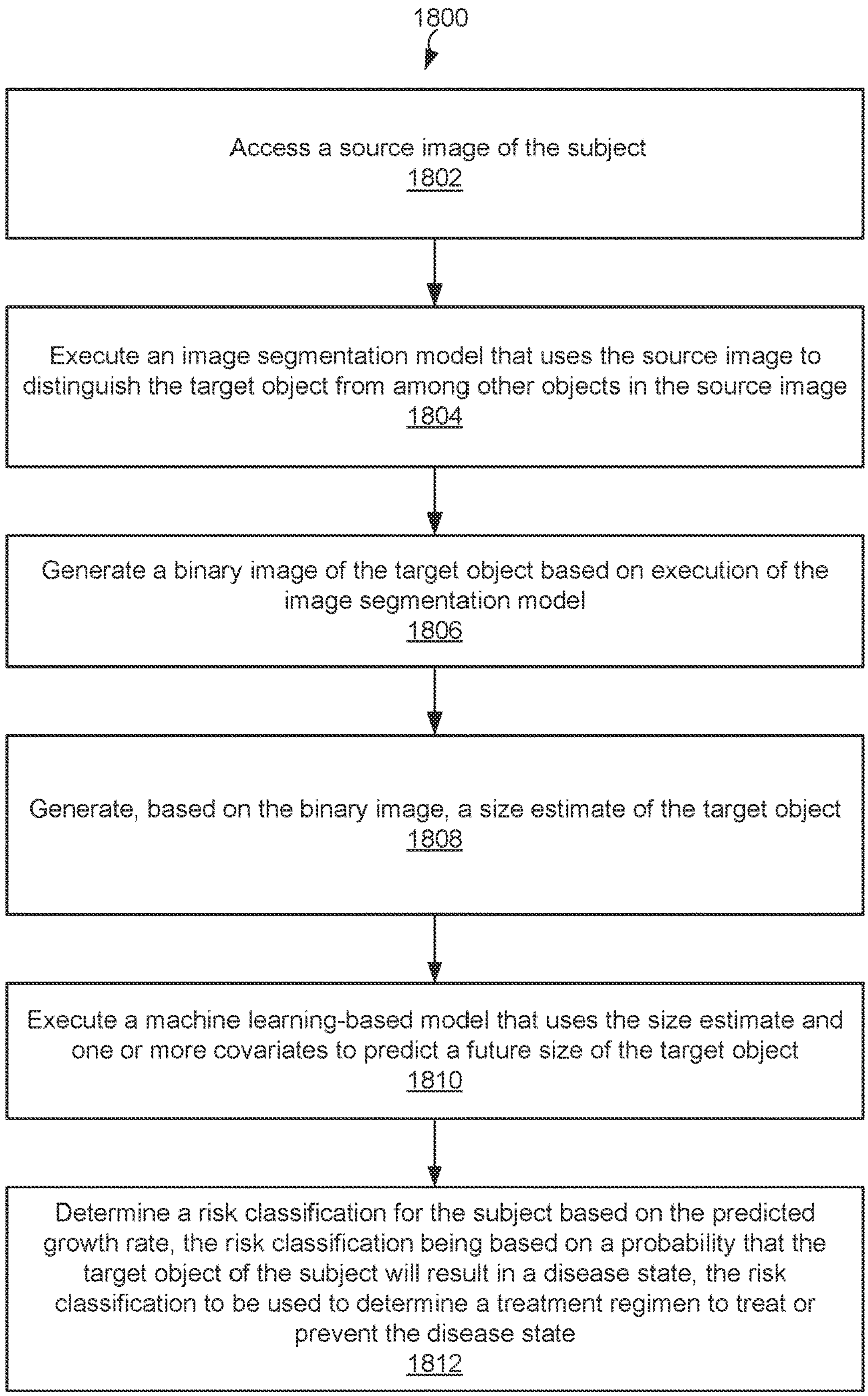
FIG. 18 illustrates an example of a method of determining a risk classification based on an estimated size of a target object and a predicted growth rate of the target object.

FIG. 18 illustrates an example of a method 1800 of determining a risk classification based on an estimated size of a target object 105 and a predicted growth rate of the target object 105. At 1802, the method 1800 may include accessing a source image 103 of the subject.

At 1804, the method 1800 may include executing an image segmentation model 132 that uses the source image to distinguish the target object from among other objects in the source image.

At 1806, the method 1800 may include generating a binary image 203 of the target object based on execution of the image segmentation model.

At 1808, the method 1800 may include generating, based on the binary image, a size estimate 131 of the target object.

At 1810, the method 1800 may include executing a machine learning-based model (growth and risk prediction model 144) that uses the size estimate and one or more covariates 107 to predict a future size 141 of the target object.

At 1812, the method 1800 may include determining a risk classification for the subject based on the predicted future size, the risk classification being based on a probability 151 that the target object of the subject will result in a disease state, the risk classification to be used to determine a treatment regimen to treat or prevent the disease state.

Examples of Systems and Computing Devices

Figure 19:
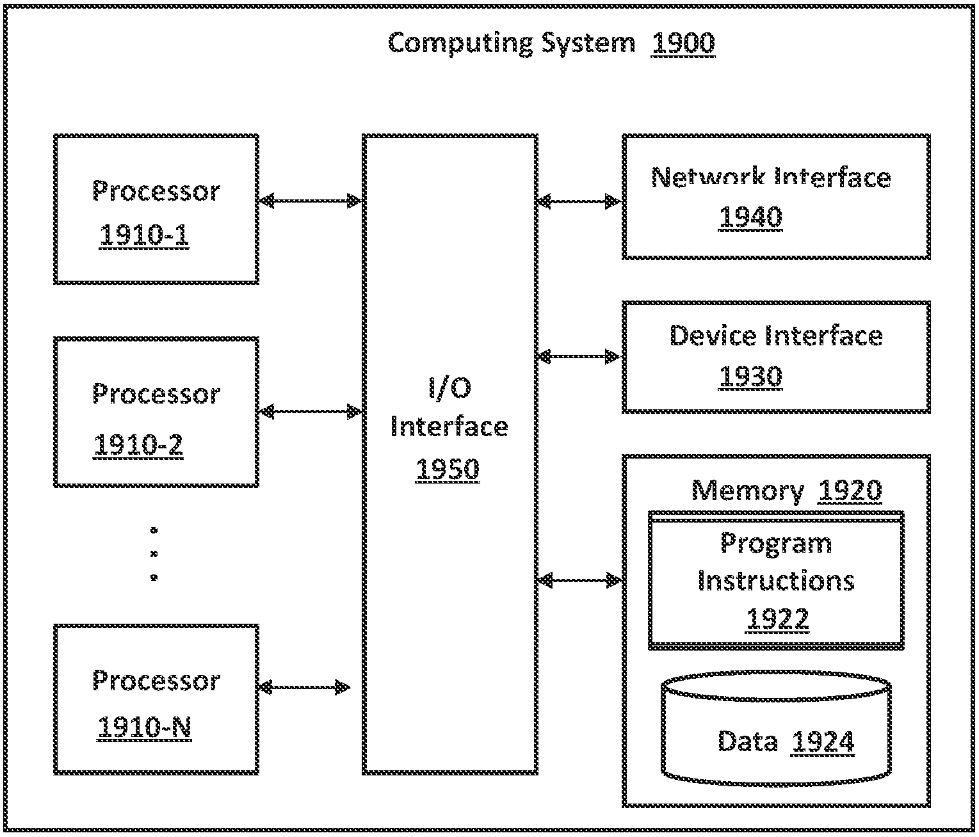
FIG. 19 illustrates an example of a computing system implemented by one or more of the features illustrated in FIG. 1.

FIG. 19 illustrates an example of a computing system 1900 implemented by one or more of the features illustrated in FIG. 1. Various portions of systems and methods described herein, may include or be executed on one or more computer systems similar to computing system 1900. Further, processes and modules described herein may be executed by one or more processing systems similar to that of computing system 1900. In some embodiments, computing device 120, client device 170, or other components of system 100 may include some or all of the components and features of computing system 1900.

Computing system 1900 may include one or more processors (for example, processors 1910-1 1910-N) coupled to system memory 1920, an input/output I/O device interface 1930, and a network interface 1040 via an input/output (I/O) interface 1050. A processor may include a single processor or a plurality of processors (for example, distributed processors). A processor may be any suitable processor capable of executing or otherwise performing instructions. A processor may include a central processing unit (CPU) that carries out program instructions to perform the arithmetical, logical, and input/output operations of computing system 1900. A processor may execute code (for example, processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (for example, system memory 1920). Computing system 1900 may be a uni-processor system including one processor (for example, processor 1910-1), or a multi-processor system including any number of suitable processors (for example, 1910-1-1910-N). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus may also be implemented as, special purpose logic circuitry, for example, an FPGA (field programmable gate array) or an ASIC (application specific integrated circuit). Computing system 1900 may include a plurality of computing devices (for example, distributed computer systems) to implement various processing functions.

I/O device interface 1930 may provide an interface for connection of one or more I/O devices to computing system 1900. I/O devices may include devices that receive input (for example, from a user) or output information (for example, to a user). I/O devices may include, for example, graphical user interface presented on displays (for example, a cathode ray tube (CRT) or liquid crystal display (LCD) monitor), pointing devices (for example, a computer mouse or trackball), keyboards, keypads, touchpads, scanning devices, voice recognition devices, gesture recognition devices, printers, audio speakers, microphones, cameras, or the like. I/O devices may be connected to computing system 1900 through a wired or wireless connection. I/O devices may be connected to computing system 1900 from a remote location. I/O devices located on remote computer system, for example, may be connected to computing system 1900 via network interface 1040.

Network interface 1040 may include a network adapter that provides for connection of computing system 1900 to a network. Network interface 1040 may facilitate data exchange between computing system 1900 and other devices connected to the network. Network interface 1040 may support wired or wireless communication. The network may include an electronic communication network, such as the Internet, a local area network (LAN), a wide area network (WAN), a cellular communications network, or the like.

System memory 1920 may store program instructions 1922 or data 1924. Program instructions 1922 may be executable by a processor (for example, one or more of processors 1910-1-1910-N) to implement one or more embodiments of the present techniques. Program instructions 1922 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (for example, one or more scripts stored in a markup language document), in a single file dedicated to the program in question, or in multiple coordinated files (for example, files that store one or more modules, sub programs, or portions of code). A computer program may be deployed to be executed on one or more computer processors located locally at one site or distributed across multiple remote sites and interconnected by a communication network.

System memory 1920 may include a tangible program carrier having program instructions stored thereon. A tangible program carrier may include a non-transitory computer readable storage medium. A non-transitory computer readable storage medium may include a machine-readable storage device, a machine-readable storage substrate, a memory device, or any combination thereof. Non-transitory computer readable storage medium may include non-volatile memory (for example, flash memory, ROM, PROM, EPROM, EEPROM memory), volatile memory (for example, random access memory (RAM), static random access memory (SRAM), synchronous dynamic RAM (SDRAM)), bulk storage memory (for example, CD-ROM and/or DVD-ROM, hard-drives), or the like. System memory 1920 may include a non-transitory computer readable storage medium that may have program instructions stored thereon that are executable by a computer processor (for example, one or more of processors 1910-1 1910-N) to cause the subject matter and the functional operations described herein. A memory (for example, system memory 1920) may include a single memory device and/or a plurality of memory devices (for example, distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may coordinate I/O traffic between processors 1910-1 1910-N, system memory 1920, network interface 1040, I/O devices, and/or other peripheral devices. I/O interface 1050 may perform protocol, timing, or other data transformations to convert data signals from one component (for example, system memory 1920) into a format suitable for use by another component (for example, processor 1910-1, processor 1910-2, . . . , processor 1910-N). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 1900 or multiple computing systems 1900 configured to host different portions or instances of embodiments. Multiple computing systems 1900 may provide for parallel or sequential processing/execution of one or more portions of the techniques described herein.

Those skilled in the art will appreciate that computing system 1900 is merely illustrative and is not intended to limit the scope of the techniques described herein. Computing system 1900 may include any combination of devices or software that may perform or otherwise provide for the performance of the techniques described herein. For example, computing system 1900 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computing system 1900 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (for example, as instructions or structured data) on a computer-accessible medium or a portable article to be read by an appropriate drive, various examples of which are described above. In some embodiments, instructions stored on a computer-accessible medium separate from computing system 1900 may be transmitted to computing system 1900 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (for example, content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to cost constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (in other words, meaning having the potential to), rather than the mandatory sense (in other words, meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, in other words, encompassing both "and" and "or." Terms describing conditional relationships, for example, "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, for example, "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, for example, the antecedent is relevant to the likelihood of the consequent occurring. Statements in which a plurality of attributes or functions are mapped to a plurality of objects (for example, one or more processors performing steps A, B, C, and D) encompasses both all such attributes or functions being mapped to all such objects and subsets of the attributes or functions being mapped to subsets of the attributes or functions (for example, both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B may include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, in other words, each does not necessarily mean each and every. Limitations as to sequence of recited steps should not be read into the claims unless explicitly specified, for example, with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (for example, "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, for example, reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, for example, text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and may be implemented in the form of data that causes functionality to be invoked, for example, in the form of arguments of a function or API call. To the extent bespoke noun phrases are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (for example, articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

This written description uses examples to disclose the embodiments, including the best mode, and to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for diagnostic image analysis of a target object that is inside a subject, the system comprising: a processor programmed to:

access a source image of the subject;

execute an image segmentation model comprising a convolutional neural network that processes the source image using a sliding window approach in which a window size equals a patch size used during training, wherein the image segmentation model processes input patch images comprising voxels from the source image and generates corresponding segmentation maps represented by a three-dimensional array of values indicating whether respective voxels belong to the target object or to other objects, and wherein adjacent segmentation maps are combined to reconstruct a final segmentation map, the image segmentation model using the source image to distinguish the target object from among other objects in the source image;

binarize a plurality of voxel values such that voxel values greater than or equal to a threshold value are set to a first value and remaining voxel values are set to a second value to generate a binary image of the target object based on execution of the image segmentation model based on the first value and the second value, the binary image distinguishing the target object from noise in the source image;

generate, based on the binary image, a size estimate of the target object;

execute a machine learning-based model that uses the size estimate and one or more covariates to predict a future size of the target object; and determine a risk classification for the subject based on the predicted future size, the risk classification being based on a probability that the target object of the subject will result in a disease state, the risk classification to be used to determine a treatment regimen to treat or prevent the disease state.

2. The system of claim 1, wherein the source image comprises a baseline image of the subject taken at a first time.

3. The system of claim 2, wherein the machine learning-based model predicts the future size based on the baseline image.

4. The system of claim 2, wherein the processor is further programmed to:

access a second source image of the subject taken at a second time after the first time, wherein the machine learning-based model predicts the future size based on the baseline image and the second source image, the machine learning-based model having been trained to predict a growth rate based on source images taken at different times.

5. The system of claim 4, wherein to predict the growth rate, the processor is further programmed to:

execute the machine learning-based model to generate a posterior probability distribution of a rate of change in size of the target object over time.

6. The system of claim 5, wherein the processor is further programmed to:

translate the posterior probability distribution to classify the data into a binary class representing the likelihood of the growth rate in the size of the target object that exceeds a threshold growth rate.

7. The system of claim 1, wherein processor is further programmed to:

automatically configure one or more hyperparameters for training the image segmentation model.

8. The system of claim 1, wherein the size estimate comprises a volume estimate.

9. The system of claim 1, wherein the target object comprises an organ or tissue of the subject.

10. The system of claim 1, wherein the target object comprises a kidney of the subject.

11. A method for diagnostic image analysis of a target object that is inside a subject, the method comprising:

accessing, by a processor, a source image of the subject;

executing, by the processor, an image segmentation model that uses the source image to distinguish the target object from among other objects in the source image;

generating, by the processor, a binary image of the target object based on execution of the image segmentation model;

generating, by the processor, based on the binary image, a size estimate of the target object;

executing, by the processor, a machine learning-based model that uses the size estimate and one or more covariates to predict a future size of the target object, wherein the machine learning-based model generates a posterior probability distribution of a rate of change in size of the target object over time based on the size estimate and the one or more covariates, and determines a probability that the rate of change exceeds a threshold growth rate; and determining, by the processor, a risk classification for the subject based on the predicted future size, the risk classification being based on a probability that the target object of the subject will result in a disease state, the risk classification to be used to determine a treatment regimen to treat or prevent the disease state.

12. The method of claim 11, wherein the source image comprises a baseline image of the subject taken at a first time.

13. The method of claim 12, wherein the machine learning-based model predicts the future size based on the baseline image.

14. The method of claim 12, the method further comprising:

accessing a second source image of the subject taken at a second time after the first time, wherein the machine learning-based model predicts the future size based on the baseline image and the second source image, the machine learning-based model having been trained to predict a growth rate based on source images taken at different times.

15. The method of claim 14, wherein predicting the growth rate comprises:

executing the machine learning-based model to generate a posterior probability distribution of a rate of change in size of the target object over time.

16. The method of claim 15, the method further comprising:

translating the posterior probability distribution to classify the data into a binary class representing the likelihood of the growth rate in the size of the target object that exceeds a threshold growth rate.

17. The method of claim 11, the method further comprising:

automatically configuring one or more hyperparameters for training the image segmentation model.

18. The method of claim 11, wherein the size estimate comprises a volume estimate.

19. The method of claim 11, wherein the target object comprises an organ or tissue of the subject.

20. A computer readable storage medium storing instructions for diagnostic image analysis of a target object that is inside a subject, the instructions when executed by a processor, causes the processor to:

access a source image of the subject;

execute an image segmentation model comprising a convolutional neural network that processes the source image using a sliding window approach in which a window size equals a patch size used during training, wherein the image segmentation model processes input patch images comprising voxels from the source image and generates corresponding segmentation maps represented by a three-dimensional array of values indicating whether respective voxels belong to the target object or to other objects, and wherein adjacent segmentation maps are combined to reconstruct a final segmentation map, the image segmentation model using the source image to distinguish the target object from among other objects in the source image;

binarize a plurality of voxel values such that voxel values greater than or equal to a threshold value are set to a first value and remaining voxel values are set to a second value to generate a binary image of the target object based on execution of the image segmentation model based on the first value and the second value, the binary image distinguishing the target object from noise in the source image;

generate, based on the binary image, a size estimate of the target object;

execute a machine learning-based model that uses the size estimate and one or more covariates to predict a future size of the target object; and determine a risk classification for the subject based on the predicted future size, the risk classification being based on a probability that the target object of the subject will result in a disease state, the risk classification to be used to determine a treatment regimen to treat or prevent the disease state.

21. A system for diagnostic image analysis of a target object that is inside a subject, the system comprising: a processor programmed to:

automatically configure one or more hyperparameters for training an image segmentation model;

access a source image of the subject;

execute the image segmentation model uses the source image to distinguish the target object from among other objects in the source image;

generate a binary image of the target object based on execution of the image segmentation model;

generate, based on the binary image, a size estimate of the target object;

execute a machine learning-based model that uses the size estimate and one or more covariates to predict a future size of the target object; and determine a risk classification for the subject based on the predicted future size, the risk classification being based on a probability that the target object of the subject will result in a disease state, the risk classification to be used to determine a treatment regimen to treat or prevent the disease state.

22. A method for diagnostic image analysis of a target object that is inside a subject, the method comprising:

automatically configuring, by a processor, one or more hyperparameters for training an image segmentation model;

accessing, by the processor, a source image of the subject;

executing, by the processor, an image segmentation model that uses the source image to distinguish the target object from among other objects in the source image;

generating, by the processor, a binary image of the target object based on execution of the image segmentation model;

generating, by the processor, based on the binary image, a size estimate of the target object;

executing, by the processor, a machine learning-based model that uses the size estimate and one or more covariates to predict a future size of the target object; and determining, by the processor, a risk classification for the subject based on the predicted future size, the risk classification being based on a probability that the target object of the subject will result in a disease state, the risk classification to be used to determine a treatment regimen to treat or prevent the disease state.

* * * * *